Figure 1:
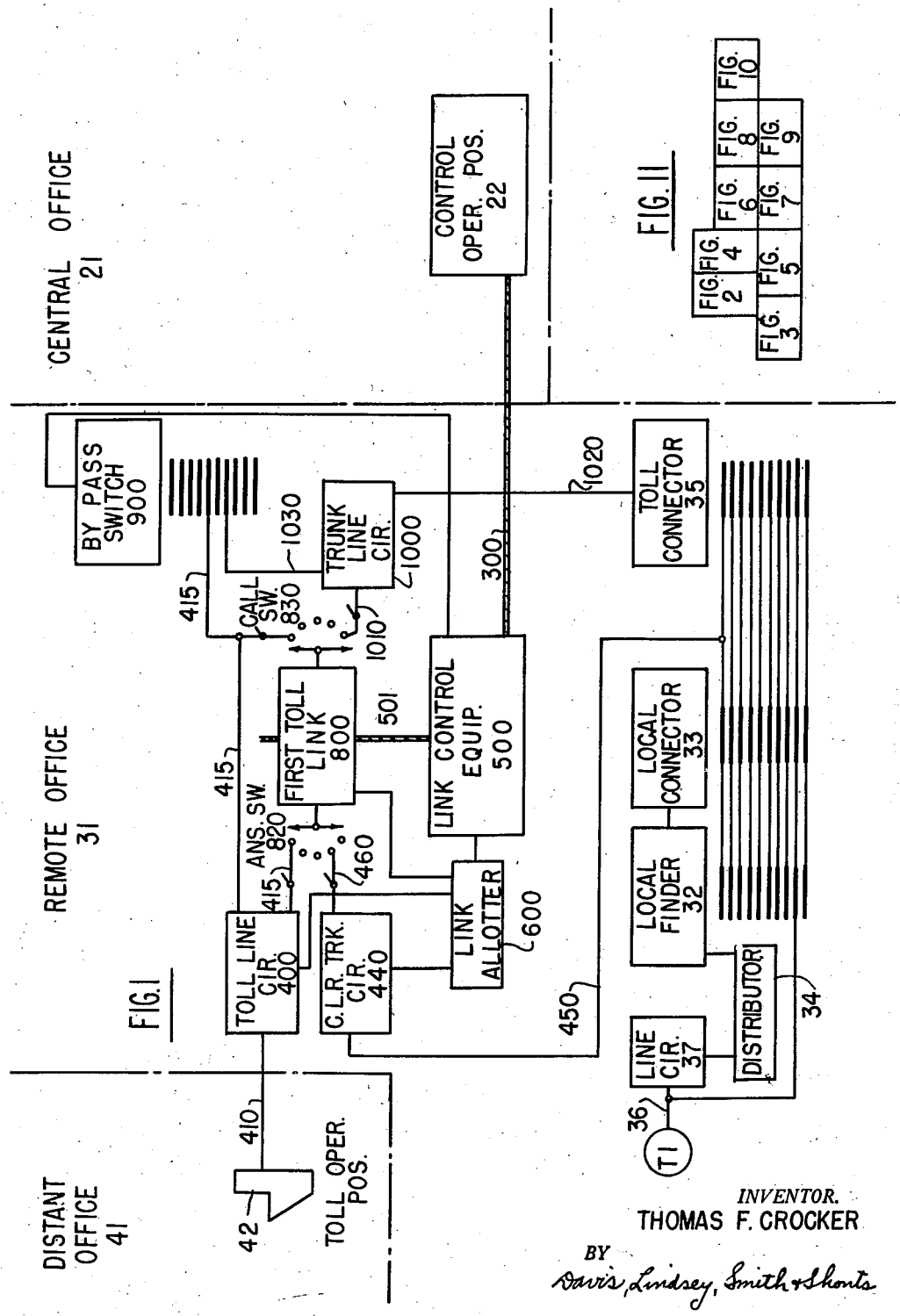

Feb. 16, 1943.  T. F. CROCKER  2,311,214
TELEPHONE SYSTEM
Filed Nov. 10, 1941  10 Sheets-Sheet 2
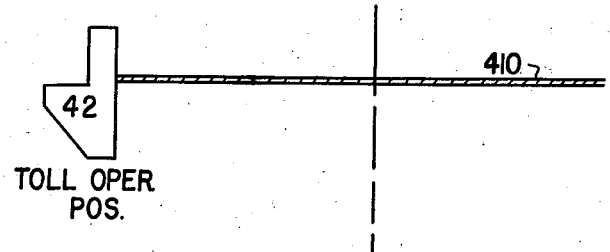
FIG.2
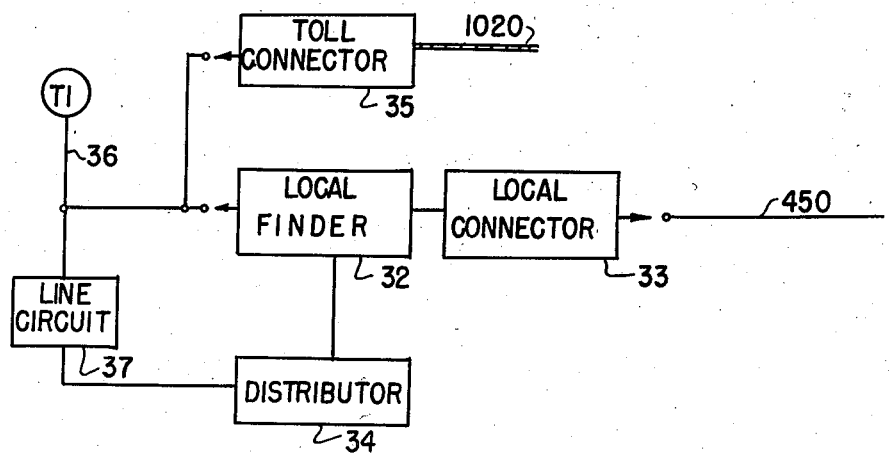
INVENTOR.
THOMAS F. CROCKER
BY
Davis, Lindsey, Smith + Shonts
ATTORNEYS Feb. 16, 1943.  T. F. CROCKER  2,311,214
TELEPHONE SYSTEM
Filed Nov. 10, 1941  10 Sheets-Sheet 4
FIG.4
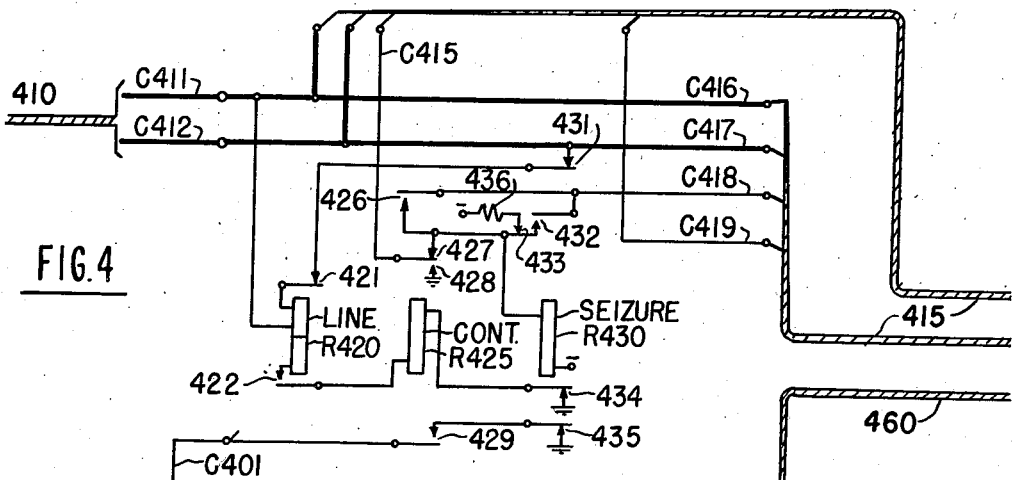
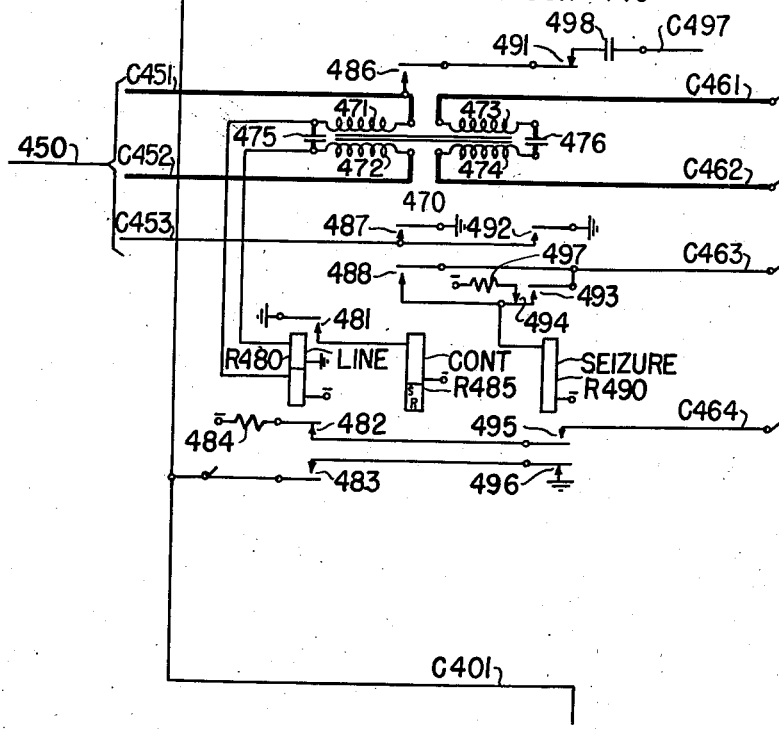
*INVENTOR.*
THOMAS F. CROCKER
BY
Davis, Lindsey, Smith & Shonts
ATTORNEYS

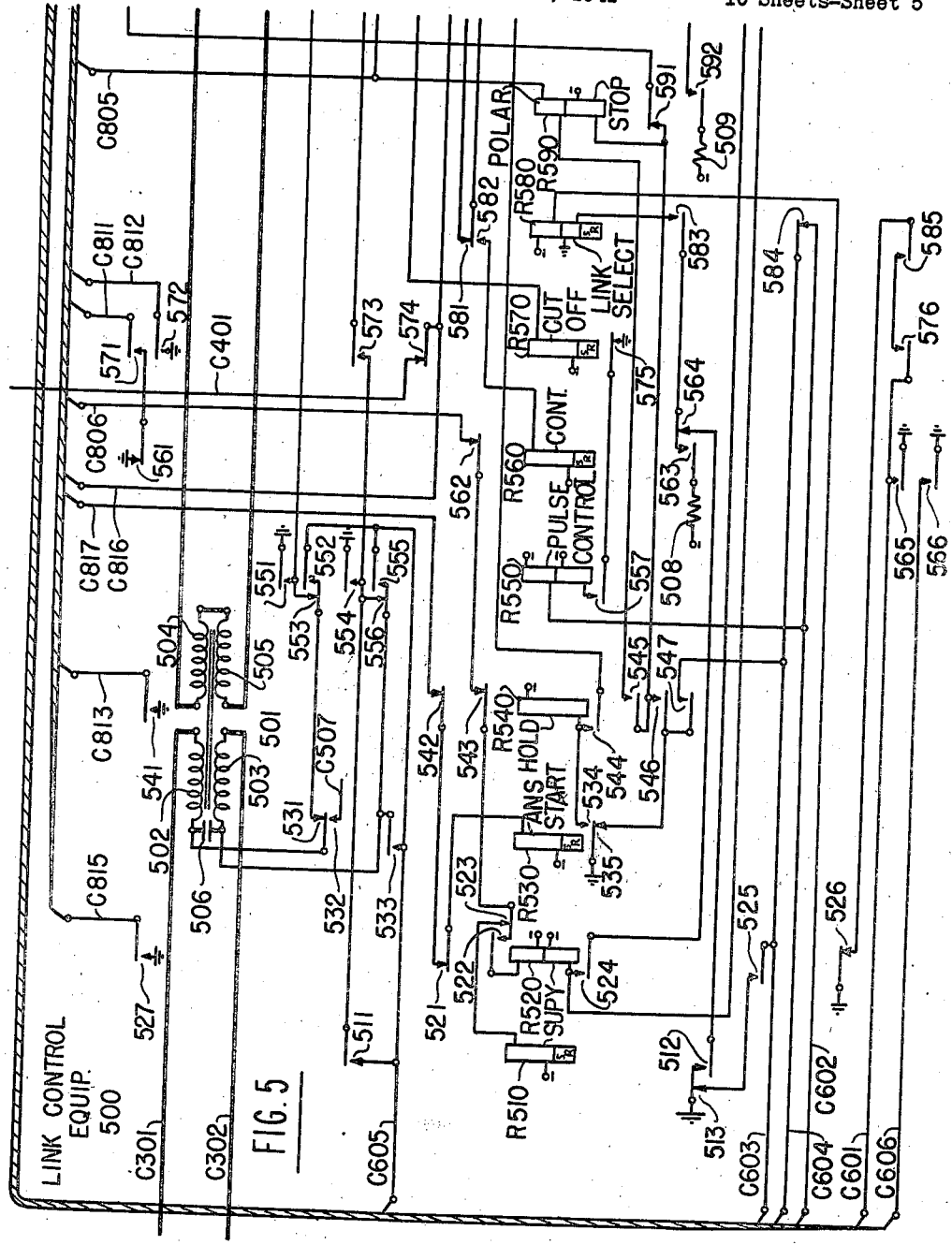

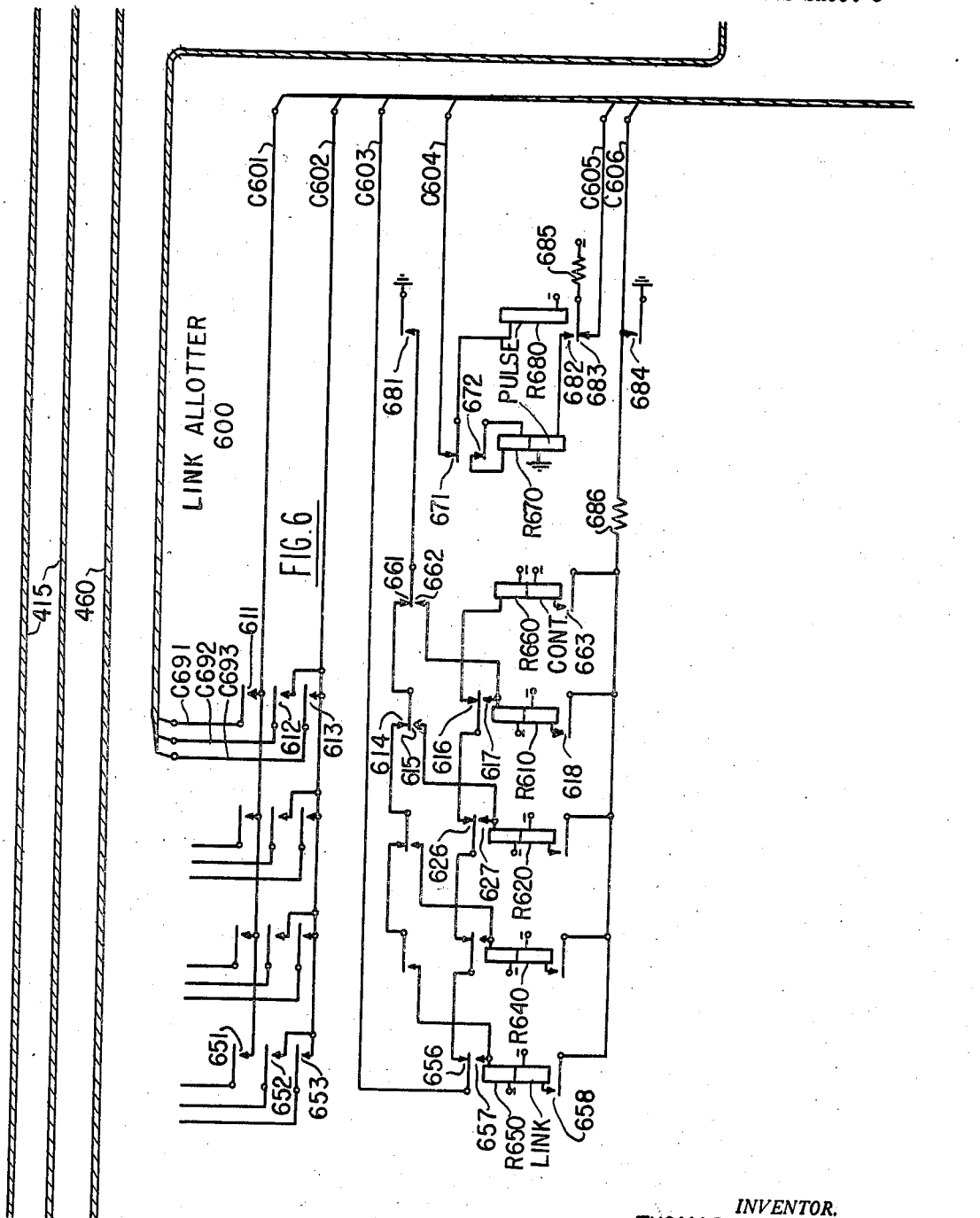

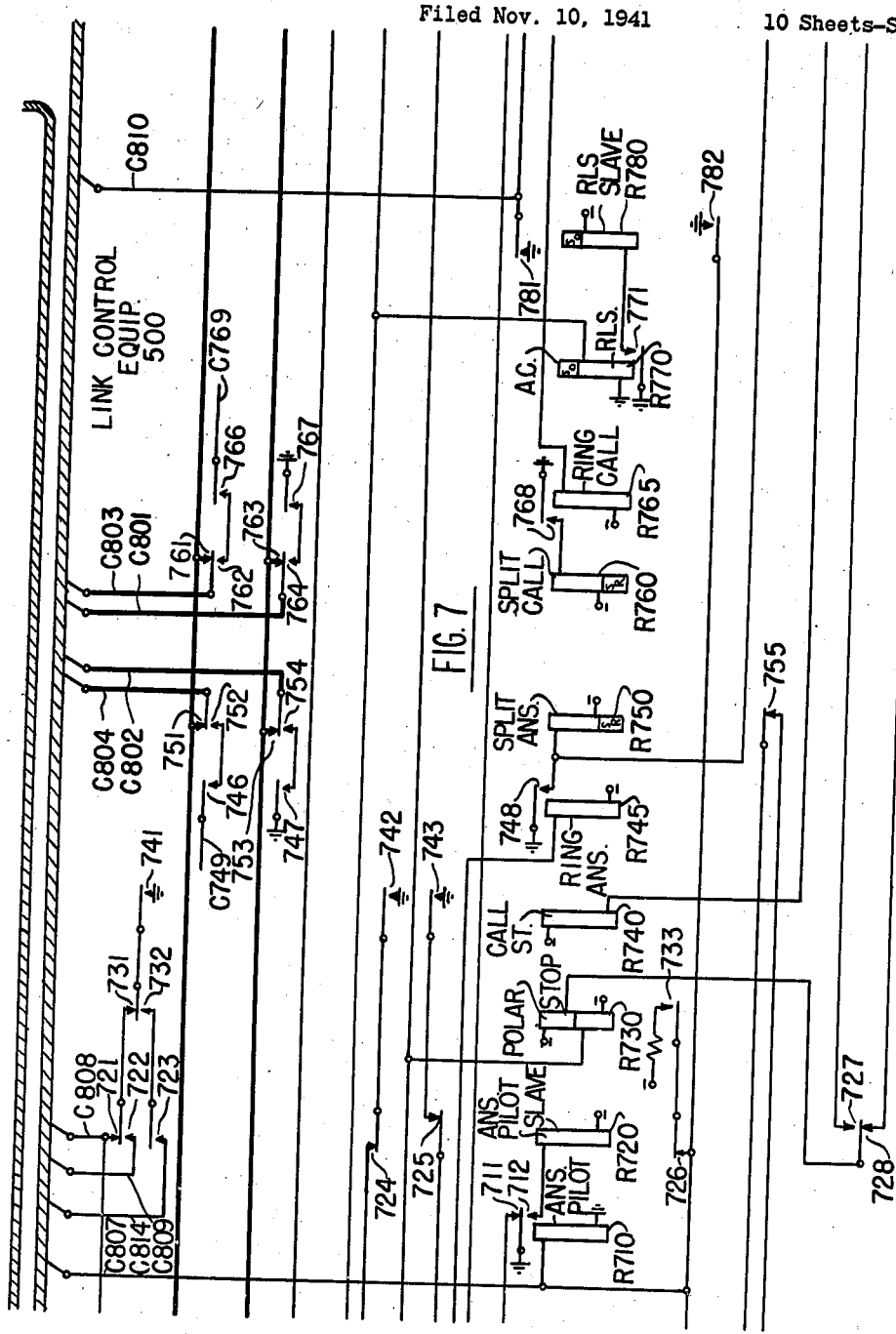

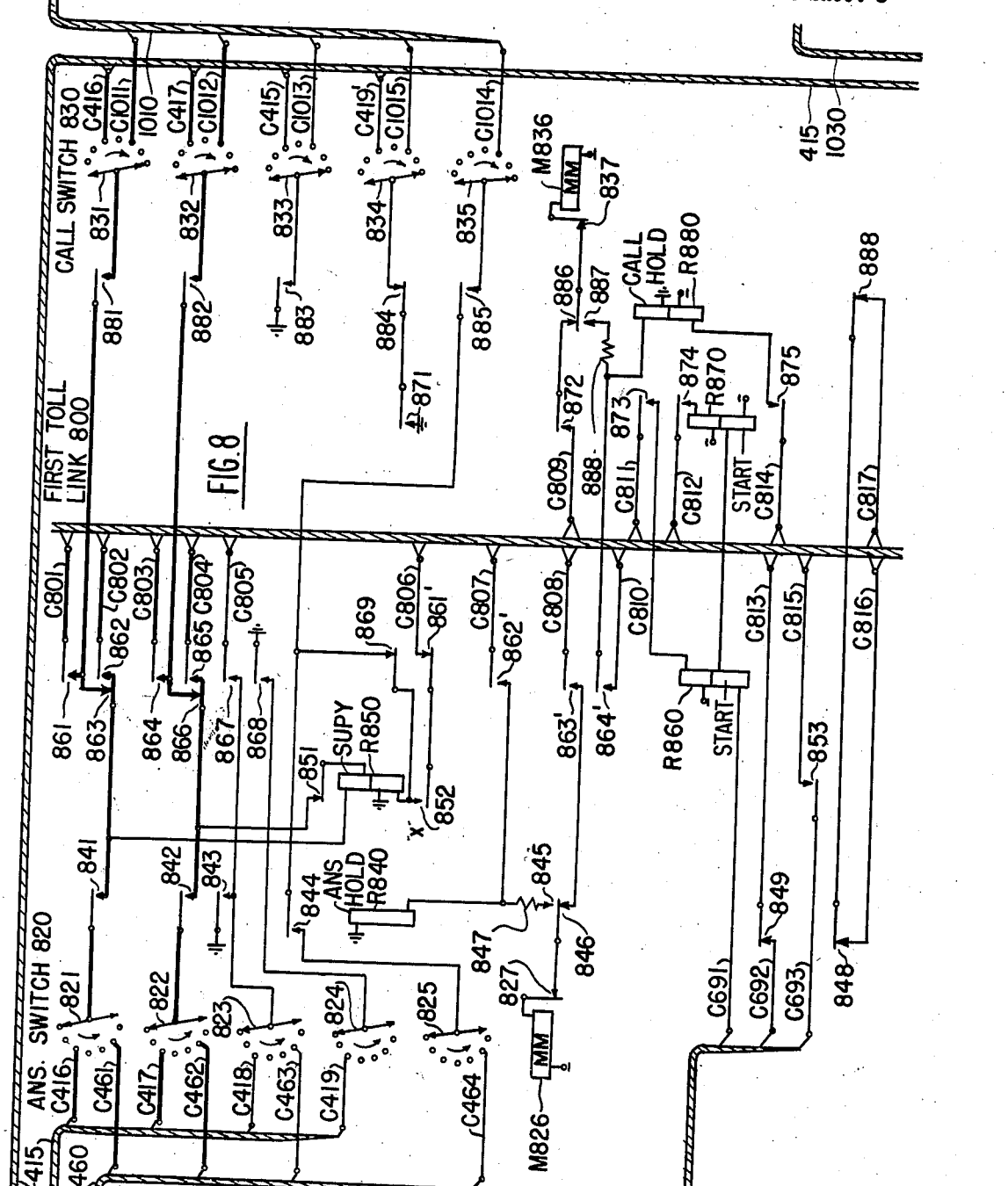

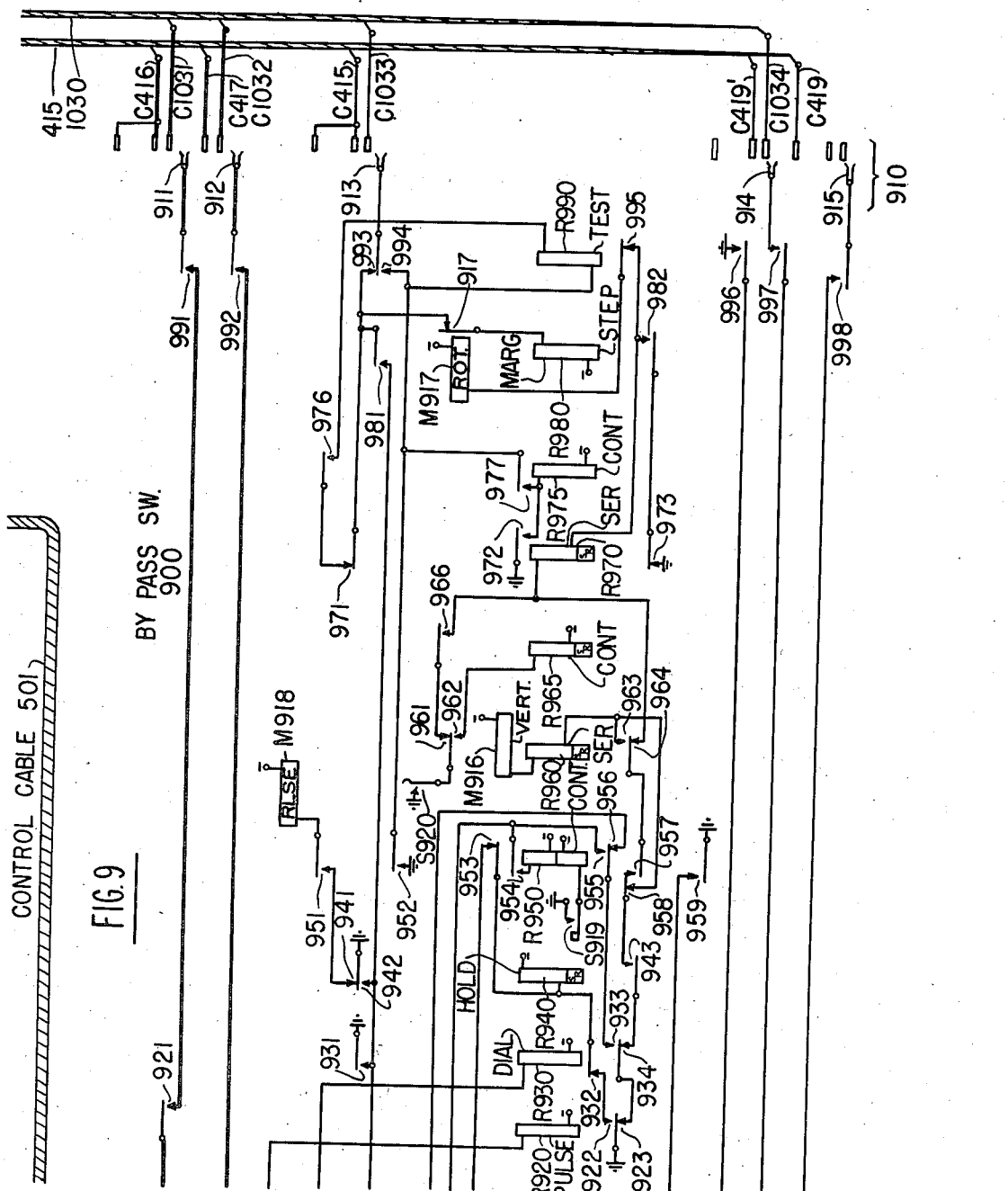

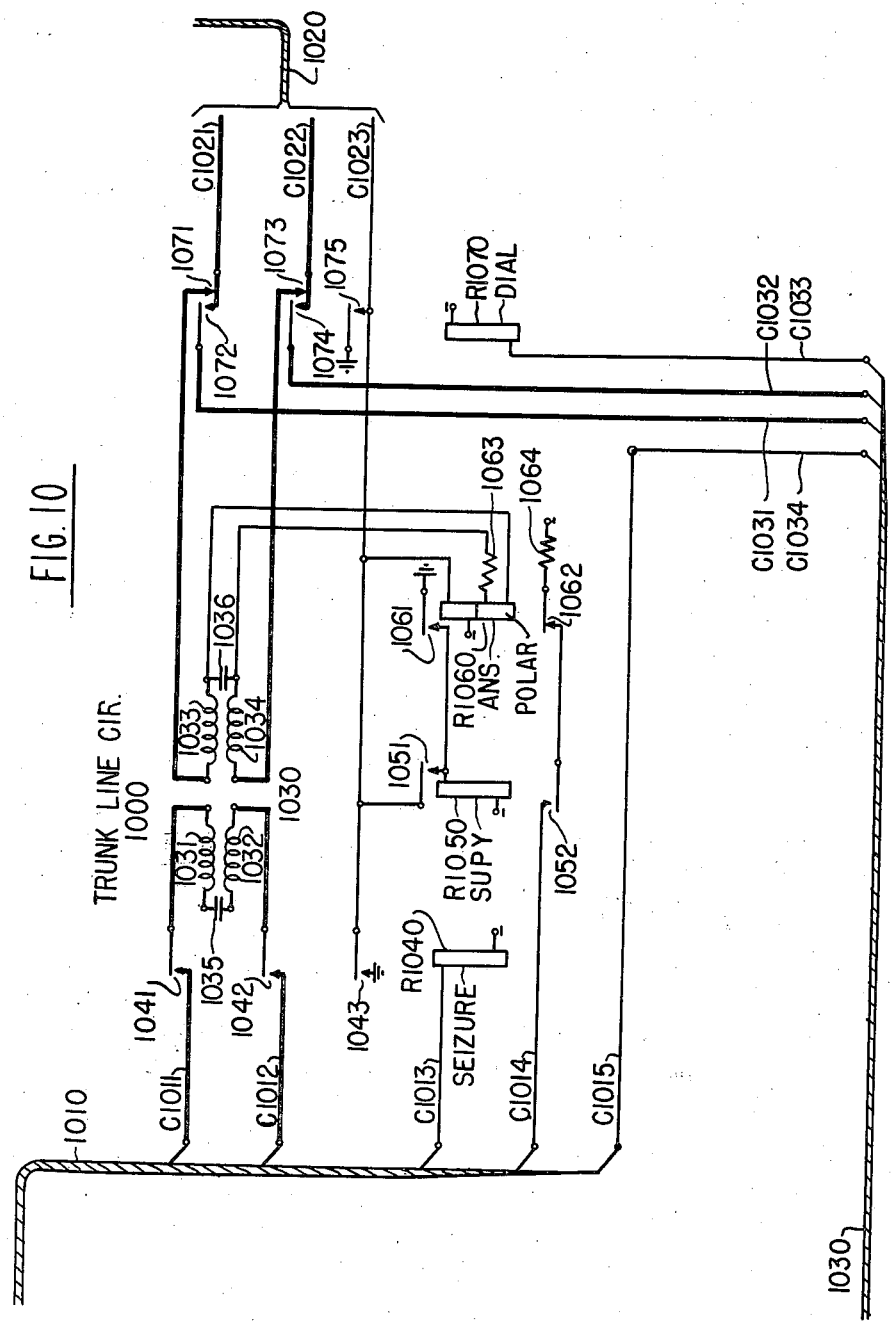

Patented Feb. 16, 1943

2,311,214

UNITED STATES PATENT OFFICE 2,311,214

TELEPHONE SYSTEM

Thomas F. Crocker, Chicago, Ill., assignor to Associated Electric Laboratories, Inc., Chicago, Ill., a corporation of Delaware Application November 10, 1941, Serial No. 418,483

29 Claims. (Cl. 179—27)

The present invention relates to telephone systems and more particularly to such systems provided with remotely disposed operator controlled automatic offices or switching centers.

It is the principal object of the present invention to provide a telephone system of the type noted comprising improved apparatus for selectively controlling a plurality of links disposed at a remote point over a single control trunk from an operator position, whereby connections may be set up and supervised in a ready and efficient manner.

Another object of the invention is to provide in a telephone system including a group of switching links, a control trunk extending to an operator position and automatic means for connecting an idle one of the links in the group having a call signal thereon to the control trunk, an arrangement for indicating to the operator at the operator position the particular idle link in the group having a call signal thereon which is connected to the control trunk.

Another object of the invention is to provide in a telephone system including a group of switching links, a control trunk extending to an operator position and automatic means for connecting a busy one of the links in the group having a supervisory signal thereon to the control trunk, an arrangement for indicating to the operator at the operator position the particular busy link in the group having a supervisory signal thereon which is connected to the control trunk.

Another object of the invention is to provide in a telephone system including a group of switching links, a control trunk extending to an operator position and means controllable over the control trunk from the operator position for connecting an idle link in the group to the control trunk and for operating the connected link to set up a delayed call, an arrangement for indicating to the operator at the operator position the particular link in the group which is connected to the control trunk.

A further object of the invention is to provide in a telephone system including a group of switching links, a control trunk extending to an operator position, automatic means for connecting idle links in the group to the control trunk and additional automatic means for connecting busy links in the group to the control trunk, an interlock arrangement for preventing more than one idle link and more than one busy link from being connected to the control trunk concurrently.

A still further object of the invention is to provide in a telephone system including a group of switching links and a control trunk of the two-conductor type extending to an operator position, link control apparatus governable over the trunk from the operator position to extend calls and to set up delayed calls by way of any link in the group and also to supervise and to release calls previously set up by way of any link in the group.

Further features of the invention pertain to the particular arrangement of the circuit elements of the system, whereby the above-outlined and additional operating features are attained.

The invention, both as to its organization and method of operation, together with further objects and advantages thereof, will best be understood by reference to the following specification taken in connection with the accompanying drawings, in which Figure 1 illustrates the general arrangement of a telephone system embodying the present invention; Figs. 2 to 10, inclusive, taken together, illustrate the details of a system having incorporated therein the features of the invention, as briefly outlined above; and Fig. 11 illustrates the mode of combining Figs. 2 to 10, inclusive, to form a unified system.

*Description of the apparatus incorporated in the system*

Referring now more particularly to Fig. 1 of the drawings the telephone system there illustrated comprises a central office 21, a remote office 31 and a distant office 41. The central office 21 and the remote office 31 are interconnected by a single control trunk 300 of the two-wire type; and the remote office 31 and the distant office 41 are interconnected by a group of toll lines, including the toll line 410, of the two-wire type. The central office 21 comprises a control operator position 22 of the automatic type; the distance office 41 comprises a toll operator position 42 of any suitable type; and the remote office 31 comprises a local switch train and toll switching equipment.

The local switch train comprises a plurality of local finder-local connector links, including the link comprising the local finder 32 and the local connector 33 and an associated distributor 34; while the toll switching equipment comprises link control equipment 500 terminating the control trunk 300 and a connected by-pass switch 900, a group of toll connectors, including the toll connector 35, a group of toll links, including the first toll link 800, and a link allotter 600. In the present example, the link allotter 600 is arranged to accommodate a group of four toll links; however, it will be understood that the number of toll links in the group may be expanded to accommodate the traffic of the system. Also the remote office 31 comprises a group of toll line circuits terminating the group of toll lines, this group including the toll line circuit 400 terminating the toll line 410; a group of C. L. R. trunk circuits terminating an associated group of C. L. R. trunks, this group including the C. L. R. trunk circuit 440 terminating the C. L. R. trunk 450; and a group of trunk line circuits terminating the group of toll connectors, this group including the trunk line circuit 1000 terminating the toll connector 35. Also the remote office 31 serves a number of local subscriber substations, including the subscriber substation T1, the subscriber substation T1 having a subscriber line 36 extending thereto which is provided with a line circuit 37 individually associated therewith.

One end of the control trunk 300 is terminated at the control operator position 22 in the central office 21; while the other end of the control trunk 300 is terminated in the link control equipment 500 in the remote office 31, as previously noted. One end of each of the toll lines in the group terminates at the toll operator position 42 in the distant office 41; while the other end of each of the toll lines in the group terminates in a corresponding one of the toll line circuits in the remote office 31. Each local finder, each local connector and each toll connector have access to each subscriber line in the remote office 31; while each local connector has access to each of the C. L. R. trunks in the group.

The by-pass switch 900 has access to a group of trunks extending to the group of toll line circuit, this group including the trunk 415 extending to the toll line circuit 400. Also the by-pass switch 900 has access to a group of trunks extending to the group of trunk line circuits, this group including the trunk 1030 extending to the trunk line circuit 1000. The group of trunk line circuits is connected to the group of toll connectors by a group of trunks, the trunk line circuit 1000 being connected to the toll connector 35 by the trunk 1020. Each of the toll links comprises an answer switch and a call switch, the first toll link 800 comprising an answer switch 820 and a call switch 830. The answer switch of each toll link has access to the group of trunks extending to the group of toll line circuits, this group including the trunk 415 extending to the toll line circuit 400. Also the answer switch of each toll link has access to a group of trunks extending to the group of C. L. R. trunk circuits, this group including the trunk 460 extending to the C. L. R. trunk circuit 440. The call switch of each toll link has access to the group of trunks extending to the group of toll line circuits, this group including the trunk 415 extending to the toll line circuit 400. Also the call switch of each toll link has access to a group of trunks extending to the group of trunk line circuits, this group including the trunk 1010 extending to the trunk line circuit 1000. Finally each of the toll links in the group is adapted to be connected under the control of the link allotter 600 to a control cable 501 extending to the link control equipment 500.

Figure 3:
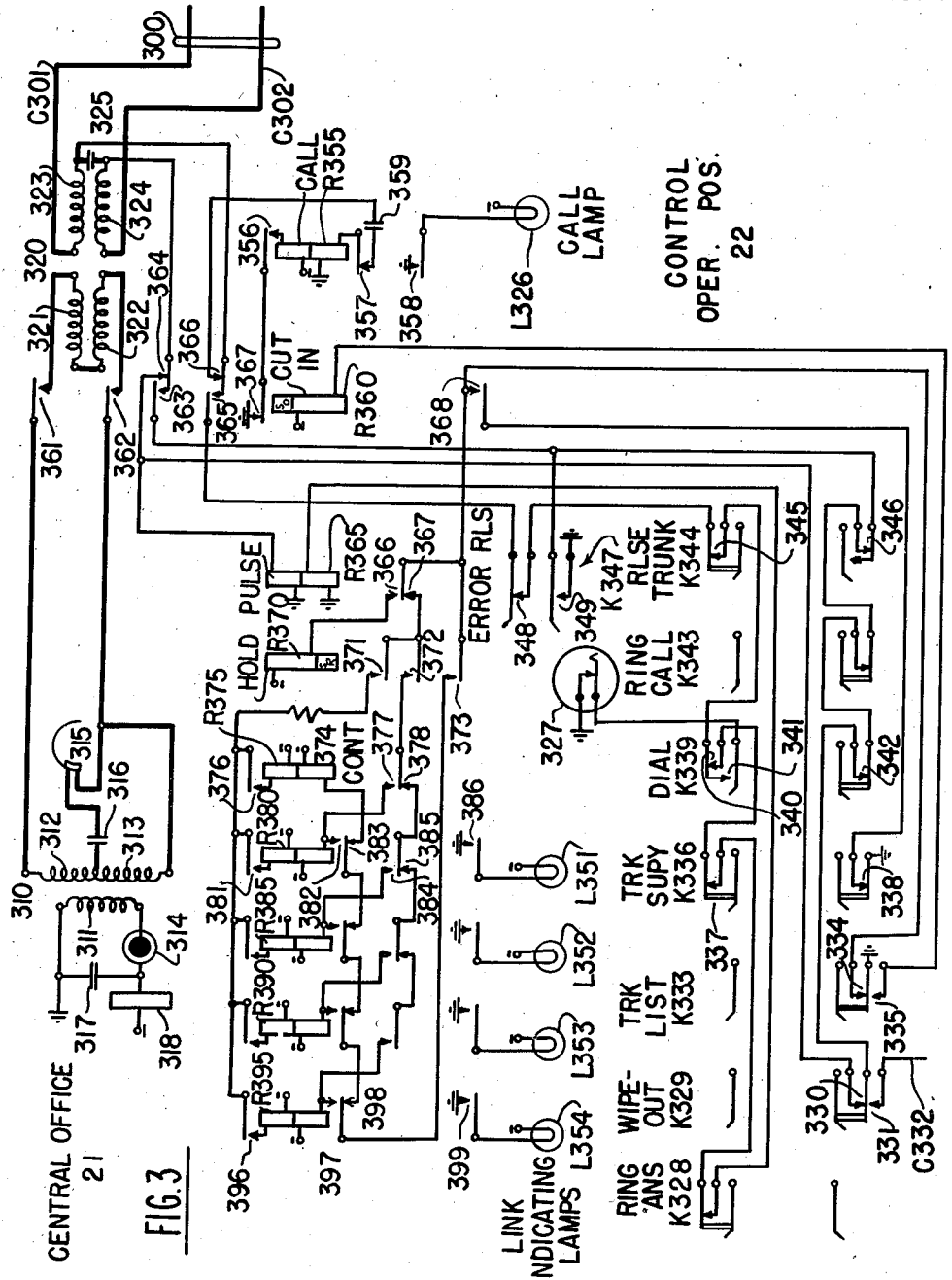

The control operator position 22 comprises, as shown in Fig. 3, a control trunk repeater 320, a position telephone repeater 310, a transmitter 314, a receiver 315, and an impedance 318. Also the control operator position 22 comprises a calling device or dial 327 and a group of link indicator lamps L351 to L354, inclusive. It is noted that this group of link indicator lamps comprises four individual link indicator lamps respectively corresponding to the four toll links in the group in the remote office 31. Further the control operator position 22 comprises a key set, including a ring answer key K328, a wipe-out key K329, a trunk listening key K333, a trunk supervisory key K336, a dial key K339, a ring call key K343, a release trunk key K344, and an error release key K347. Finally the control operator position 22 comprises a call lamp L326, a relay group including a call relay R355, a cut-in relay R360, a pulse relay R365, a hold relay R370, a control relay R375 and four signal relays R380, R385, R390 and R395, and a control network connected and arranged in a manner more fully explained hereinafter. Again it is noted that the relay group comprises four signal relays R380, R385, R390 and R395 respectively corresponding to the four link indicator lamps L351 to L354, inclusive, and to the four toll links in the group in the remote office 31.

The link control equipment 500 comprises, as shown in Figs. 5 and 7, a control trunk repeater 501; a relay group, including two supervisory relays R510 and R520, an answer start relay R530, a hold relay R540, a pulse control relay R550, a control relay R560, a cutoff relay R570, a link select relay R580, two stop relays R590 and R730, an answer pilot relay R710, an answer pilot slave relay R720, a call start relay R740, a ring answer relay R745, a split answer relay R750, a split call relay R760, a ring call relay R765, a release relay R770 and a release slave relay R780; and a control network connected and arranged in a manner more fully described hereinafter.

The by-pass switch 900 comprises, as shown in Fig. 9, a Strowger mechanism 910 including a wiper set provided with five wipers 911 to 915, inclusive, having an associated contact bank terminating contact sets disposed in circumferentially arranged levels. Also the Strowger mechanism 910 comprises a vertical magnet M916 for driving the wiper set in the vertical direction, a rotary magnet M917 for driving the wiper set in the rotary direction, and a release magnet M918 for releasing the wiper set and for causing it to be returned to its normal position. Also associated with the Strowger mechanism 910 are two sets of switch springs S919 and S920 which are operated by the movement of the wiper set, in a manner more fully explained hereinafter. Further, the by-pass switch 900 comprises a relay group including an impulse relay R920, a dial relay R930, a hold relay R940, three control relays R950, R965 and R975, two series relays R960 and R970, a step relay R980 and a test relay R990, and a control network connected and arranged in a manner more fully explained hereinafter. At this point it is noted that the by-pass switch 900 is arranged for either one-digit or two-digit control, this switch selectively operating as a one-digit or a two-digit automatic trunk hunting selector.

Each subscriber substation in the remote office 31 comprises conventional automatic substation equipment, including a telephone instrument, a ringer and a calling device or dial; and the toll operator position 42 in the distant office 41 comprises conventional operator position equipment. Also in the remote office 31 each of the line circuits, as well as the associated distributor 34, shown in Fig. 2, is of conventional connection and arrangement. Further each of the toll connectors, each of the local finders and each of the local connectors, shown in Fig. 2, are of conventional connection and arrangement; preferably, these switches are of the well-known Strowger type.

Preferably, each of the toll line circuits is identical to the toll line circuit 400, shown in Fig. 4, which comprises a relay group, including a line relay R420, a control relay R425 and a seizure relay R430, and a control network connected and arranged in a manner more fully described hereinafter. Preferably, each of the C. L. R. trunk circuits is identical to the C. L. R. trunk circuit 440, shown in Fig. 4, which comprises a relay group including a line relay R480, a control relay R485 and a seizure relay R490, a C. L. R. trunk repeater 470, and a control network connected and arranged in a manner more fully described hereinafter. Preferably, each of the trunk line circuits is identical to the trunk line circuit 1000, shown in Fig. 10, which comprises a relay group including a seizure relay R1040, a supervisory relay R1050, an answer relay R1060 and a dial relay R1070, a trunk repeater 1030, and a control network connected and arranged in a manner more fully described hereinafter.

The link allotter 600, shown in Fig. 6, comprises a relay group including two pulse relays R670 and R680, a control relay R660, and four link relays R610, R620, R640 and R650, and a control network connected and arranged in a manner more fully described hereinafter. It is noted that the four link relays R610, R620, R640 and R650 in the link allotter 600 respectively correspond to the four toll links in the group mentioned.

Preferably, each of the toll links is identical to the first toll link 800, shown in Fig. 8, which comprises an answer switch 820 and a call switch 830. The answer switch 820 is of the rotary type, including five wipers 821 to 825, inclusive, provided with individually associated contact banks, and a magnet M826 for driving the wipers noted; similarly, the call switch 830 is of the rotary type, including five wipers 831 to 835, inclusive, provided with individually associated contact banks, and a magnet M836 for driving the wipers noted. Also the first toll link 800 comprises a relay group including an answer hold relay R840, a supervisory relay R850, two start relays R860 and R870 and a call hold relay R880, and a control network connected and arranged in a manner more fully described hereinafter.

A better understanding of the connection and arrangement of the apparatus incorporated in the system will be facilitated from a consideration of the detailed operation of the various pieces of apparatus incident to the setting up of the various toll and trunk calls, as will appear hereinafter.

*Initiation of a toll call at a subscriber substation in the remote office*

Considering now the initiation of a toll call at a subscriber substation, such, for example, as the subscriber substation T1 in the remote office 31, the subscriber at the calling subscriber substation T1 first removes the receiver of the telephone instrument thereat from its associated switchhook, whereby the line circuit 37 individually associated with the subscriber line 36 operates in order to initiate operation of the associated distributor 34. The distributor 34 operates in order to assign an idle one of the local links to the use of the calling subscriber substation T1, such, for example, as the local link illustrated. The local finder switch 32 then operates to find the subscriber line 36 extending to the calling subscriber substation T1, whereupon the local connector 33 is rendered responsive to digits transmitted thereto and the line circuit 37 operates in order to mark the subscriber line 36 as busy to the toll connectors and local connectors having access thereto. The subscriber at the calling subscriber substation T1 then dials one or more digits into the local connector 33, thereby to cause the local connector 33 to seize an idle C. L. R. trunk in the associated group, such, for example, as the C. L. R. trunk 450. When the C. L. R. trunk 450 is thus seized a series circuit is completed for energizing the upper and lower windings of the line relay R480 in the C. L. R. trunk circuit 440; this circuit extending from ground by way of the upper winding of R480 and the winding 472 of the repeater 470 to the line conductor C452, and from battery by way of the lower winding of R480 and the winding 471 of the repeater 470 to the line conductor C451, the line conductors C451 and C452 of the C. L. R. trunk 450 being connected by way of the local connector 33, the local finder 32 and the subscriber line 36 to the calling subscriber substation T1.

When the line relay R480 is thus energized it operates to complete, at the contacts 481, an obvious circuit for energizing the winding of the control relay R485, thereby to cause the latter relay to operate. Also the line relay R480 completes, at the contacts 483, an obvious path, including the contacts 496, for applying ground potential to the conductor C401 extending to the link control equipment 500. Upon operating, the control relay R485 completes, at the contacts 486, a circuit, including the ring-back tone conductor C497, the condenser 498 and the contacts 491 and 486, for returning ring-back tone current over the C. L. R. trunk 450 to the calling subscriber substation T1, thereby to indicate to the subscriber thereat that the call is being extended. Also the control relay R485 completes, at the contacts 487, an obvious path for applying ground potential to the control conductor C453 of the C. L. R. trunk 450, thereby to mark this trunk as busy to the local connectors having access thereto. Further the control relay R485 completes, at the contacts 488, an obvious multiple path for applying battery potential by way of the resistor 497 and the winding of the seizure relay R490 to the control conductor C463 of the trunk 460, thereby to mark the trunk 460 extending to the C. L. R. trunk circuit 440 as a calling trunk to the answer switches of the various toll links.

The application of ground potential to the conductor C401 completes a path for applying ground potential to the start conductor C817 in the control cable 501, in the event one or more of the toll links in the associated group are idle at this time. For example, in the event the first toll link 800 is idle at this time, the grounded conductor C401 is connected by way of the contacts 574, the conductor C816 in the control cable 501, the contacts 848 of the restored answer hold relay R840 in the first toll link 800 and the contacts 888 of the restored call hold relay R880 in the first toll link 800 to the start conductor C817. The application of ground potential to the start conductor C817 completes a circuit, including the contacts 542 and 521, for energizing the winding of the answer start relay R530 in the link control equipment 500. When thus energized the answer start relay R530 operates to complete, at the contacts 534, an obvious circuit for energizing the winding of the hold relay R540, thereby to cause the latter relay to operate. Also, upon operating, the answer start relay R530 completes, at the contacts 532, an obvious circuit, including the ring conductor C507 and the winding 502 of the repeater 501, for projecting ringing current over the line conductor C301 of the control trunk 300. The ringing current projected over the line conductor C301 of the trunk 300 completes a circuit, including the winding 323 of the repeater 320, the contacts 366 and 357 and the condenser 359, for energizing the lower winding of the call relay R355 at the control operator position 22 in the central office 21, thereby to cause the latter relay to operate. Upon operating, the call relay R355 completes, at the contacts 356, an obvious holding circuit for energizing the upper winding thereof; interrupts, at the contacts 357, the previously traced circuit for energizing the lower winding thereof; and completes, at the contacts 358, an obvious circuit for illuminating the call lamp L326. The illumination of the call lamp L326 indicates to the operator at the control operator position 22 that the control trunk 300 has been seized due to a switching operation in the remote office 31 requiring her attention.

Upon operating, the hold relay R540 completes, at the contacts 544, an obvious holding circuit, including the contacts 711, for energizing the winding thereof; and interrupts, at the contacts 542, the previously traced circuit for energizing the winding of the answer start relay R530; thereby to cause the latter relay to restore shortly thereafter, the answer start relay R530 being of the slow-to-release type. Also the hold relay R540 completes, at the contacts 541, an obvious path for applying ground potential to the conductor C813 in the control cable 501; and interrupts, at the contacts 543, a point in a circuit traced hereinafter, including the supervisory conductor C806 in the control cable 501, for energizing the winding of the supervisory relay R510. Upon restoring, the answer start relay R530 completes, at the contacts 535, a circuit including the contacts 546 for energizing the lower winding of the stop relay R590; thereby to render the latter relay fast to operate when the upper winding thereof is energized, the stop relay R590 being of the polarized type. Also the answer start relay R530 prepares, at the contacts 535, an obvious circuit, including the contacts 546 and 545, for energizing the upper winding of the stop relay R590; completes, at the contacts 535, an obvious path, including the contacts 547, for applying ground potential to the conductor C603 extending to the link allotter 600; completes, at the contacts 535, an obvious path, including the contacts 547 and 584, for applying ground potential to the conductor C604 extending to the link allotter 600; and completes, at the contacts 535, a path, including the contacts 548 and 591, for applying ground potential to the conductor C808 in the control cable 501. Finally the answer relay R530 completes, at the contacts 535, a circuit, including the contacts 547 and 584, for energizing the upper winding of the pulse control relay R550, thereby to cause the latter relay to operate.

Upon operating, the pulse control relay R550 completes, at the contacts 557, an obvious holding circuit, including the contacts 575, for energizing the lower winding thereof. Also the pulse control relay R550 completes, at the contacts 551, an obvious circuit for energizing the winding of the impulse relay R920 in the by-pass switch 900, thereby to cause the latter relay to operate. Upon operating, the impulse relay R920 completes, at the contacts 922, an obvious circuit, including the contacts 932, for energizing the winding of the hold relay R940, thereby to cause the latter relay to operate. Upon operating, the hold relay R940 completes, at the contacts 942, an obvious circuit for energizing in multiple the winding of the cutoff relay R570 and the lower winding of the stop relay R730, thereby to cause the cut-off relay R570 to operate. When the lower winding of the stop relay R730 is thus energized this relay is rendered fast to operate when the upper winding thereof is energized, the stop relay R730 being of the polarized type.

Upon operating, the cutoff relay R570 interrupts, at the contacts 575, the previously traced holding circuit for energizing the lower winding of the pulse control relay R550. However, the latter relay does not restore as the previously traced circuit for energizing the upper winding thereof is completed at this time. Further the cutoff relay R570 completes, at the contacts 571, an obvious path, including the contacts 561, for applying ground potential to the conductor C811 in the control cable 501; completes, at the contacts 572, an obvious path for applying ground potential to the conductor C812 in the control cable 501; interrupts, at the contacts 574, a further point in the previously traced circuit, including the grounded conductor C401, for energizing the winding of the answer start relay R530; and prepares, at the contacts 576, a path traced hereinafter for applying ground potential to the conductor C601 extending to the link allotter 600. Further the cutoff relay R570 completes, at the contacts 573, an obvious circuit, including the contacts 554, for energizing the winding of the dial relay R930 in the by-pass switch 900, thereby to cause the latter relay to operate. Upon operating, the dial relay R930 completes, at the contacts 931, an obvious alternative holding circuit for energizing in multiple the winding of the cutoff relay R570 and the lower winding of the stop relay R730; and interrupts, at the contacts 932, the previously traced circuit for energizing the winding of the hold relay R940, thereby to cause the latter relay to restore shortly thereafter, the hold relay R940 being of the slow-to-release type.

Further the control pulse relay R550, upon operating, interrupts, at the contacts 553 and 556, respectively, obvious connections between the line conductors C301 and C302 of the control trunk 300 and the windings of the impulse relay R920 and the dial relay R930. Further the pulse control relay R550 completes, at the contacts 552 and 555, a connection between the impulse conductor C605 extending to the link allotter 600 and the line conductors C301 and C302 of the control trunk 300. This connection extends from the impulse conductor C605 by way of the contacts 552 and 531 and the winding 502 of the repeater 501 to the line conductor C301 of the control trunk 300, and from the impulse conductor C605 by way of the contacts 555 and the winding 503 of the repeater 501 to the line conductor C302 of the control trunk 300.

The application of ground potential to the conductor C604 extending to the link allotter 600 completes an obvious circuit, including the contacts 671, for energizing the winding of the pulse relay R680, thereby to cause the latter relay to operate. Upon operating, the pulse relay R680 interrupts, at the contacts 683, a circuit for energizing the upper winding of the pulse relay R365 at the control operator position 22 in the central office 21, the last-mentioned circuit being previously completed incident to the operation of the answer start relay R530 in the link control equipment 500, previously explained. The circuit for energizing the upper winding of the pulse relay R365 extends, when completed, from ground by way of the upper winding of R365, the contacts 364, the winding 324 of the repeater 320, the line conductor C302 of the control trunk 300, the winding 503 of the repeater 501, the contacts 533, the impulse conductor C605, the contacts 683 and the resistor 685 to battery. When the above-traced circuit was previously completed the pulse relay R365 operated, for a purpose more fully explained hereinafter. At this time the above-traced circuit for energizing the upper winding of the pulse relay R365 is interrupted at the contacts 683 incident to the operation of the pulse relay R680, as noted above, thereby to cause the pulse relay R365 to restore. Also, upon operating, the pulse relay R680 completes, at the contacts 682, an obvious circuit, including the resistor 685, for energizing the lower winding of the pulse relay R670, thereby to cause the latter relay to operate shortly thereafter, the pulse relay R670 being rendered slow to operate due to the normally completed path for short-circuiting the upper winding thereof. Upon operating, the pulse relay R670 interrupts, at the contacts 672, the previously mentioned path for short-circuiting the upper winding thereof; and interrupts, at the contacts 671, the previously traced circuit for energizing the winding of the pulse relay R680, thereby to cause the latter relay to restore. Upon restoring, the pulse relay R680 recompletes, at the contacts 683, the previously traced circuit for energizing the upper winding of the pulse relay R365 at the control operator position 22 in the central office 21 in order to cause the latter relay to reoperate. Also the pulse relay R680 interrupts, at the contacts 682, the previously traced circuit for energizing the lower winding of the pulse relay R670, thereby to cause the latter relay to restore. Upon restoring, the pulse relay R670 recompletes, at the contacts 672, the previously mentioned path for short-circuiting the upper winding thereof; and recompletes, at the contacts 671, the previously traced circuit for energizing the winding of the pulse relay R680, thereby to cause the latter relay to reoperate. In view of the foregoing explanation of the mode of operation of the pulse relays R670 and R680, it will be understood that these relays are operated continuously through repeated cycles as long as ground potential remains upon the conductor C604 extending to the link allotter 600.

The application of ground potential to the conductor C603 extending to the link allotter 600 completes a circuit, including the contacts 656, etc., and 616, for energizing the upper winding of the control relay R660, thereby to cause the latter relay to operate. Upon operating, the control relay R660 prepares, at the contacts 662, a circuit traced hereinafter for energizing the upper winding of the link relay R610; and prepares, at the contacts 663, a holding circuit traced hereinafter for energizing the lower winding thereof. The first time the pulse relay R680 operates it completes, at the contacts 681, the previously mentioned circuit, including the contacts 662, for energizing the upper winding of the link relay R610, thereby to cause the latter relay to operate; and completes, at the contacts 684, the previously mentioned holding circuit, including the resistor 686 and the contacts 663, for energizing the lower winding of the control relay R660. When thus energized the link relay R610 operates to complete, at the contacts 618, an obvious holding circuit, including the resistor 686 and the contacts 684, for energizing the lower winding thereof. Also, the link relay R610 completes, at the contacts 617, a holding circuit, including the grounded conductor C603 and the contacts 656, etc., for energizing the upper winding thereof; and interrupts, at the contacts 616, the previously traced circuit, including the grounded conductor C603, for energizing the upper winding of the control relay R660. Finally the link relay R610 prepares, at the contacts 615, a circuit traced hereinafter for energizing the upper winding of the link relay R620.

The first time the pulse relay R680 restores it interrupts, at the contacts 684, the previously traced holding circuits for energizing in multiple the lower winding of the link relay R610 and the lower winding of the control relay R660; thereby to cause the control relay R660 to restore, the link relay R610 being retained in its operated position due to the completed holding circuit, including the grounded conductor C603, for energizing the upper winding thereof. Further, upon restoring, the control relay R660 prepares, at the contacts 661, a further point in the previously mentioned circuit for energizing the upper winding of the link relay R620.

In the event the pulse relay R680 reoperates it completes, at the contacts 681, the previously mentioned circuit, including the contacts 661 and 615, for energizing the upper winding of the link relay R620, thereby to cause the latter relay to operate. Also, upon reoperating, the pulse relay R680 completes, at the contacts 684, the previously traced holding circuit for energizing the lower winding of the link relay R610 and an obvious multiple holding circuit for energizing the lower winding of the link relay R620. Upon operating, the link relay R620 completes, at the contacts 627, an obvious holding circuit, including the grounded conductor C603 and the contacts 656, etc., for energizing the upper winding thereof; and interrupts, at the contacts 626, the previously traced holding circuit, including the grounded conductor C603, for energizing the upper winding of the link relay R610. When the pulse relay R680 again restores it interrupts, at the contacts 684, the previously traced multiple holding circuits for energizing the lower windings of the link relays R610 and R620, thereby to cause the link relay R610 to restore; the link relay R620 being retained in its operated position, due to the completed holding circuit including the grounded conductor C603 for energizing the upper winding thereof. In view of the foregoing explanation of the mode of operation of the pulse relays R670 and R680 in conjunction with the control relay R660 and the link relays R610, R620, etc., it will be understood that the link relays R610, R620, R640 and R650 are operated and restored sequentially as the pulse relays R670 and R680 operate through successive cycles.

When the first link relay R610 in the link allotter 600 operates it prepares, at the contacts 612, a test circuit, including the test conductor C602, to determine the idle or busy condition of the first toll link 800 in the associated group. In the event the first toll link 800 is busy at this time, the answer hold relay R840 therein occupies its operated position, interrupting, at the contacts 849, a connection between the grounded conductor C813 in the control cable 501 and the test conductor C602; whereby the pulse relays R670 and R680 subsequently effect operation of the second link relay R620 in the link allotter 600 in order to cause the idle or busy condition of the second toll link in the associated group to be tested. On the other hand, in the event the first toll link 800 in the associated group is idle when the first link relay R610 in the link allotter 600 operates, and the idle or busy condition of the first toll link 800 is tested, the answer hold relay R840 therein occupies its restored position; whereby the previously mentioned test circuit is completed in order to arrest further operation of the link relays R610, etc., in the link allotter 600.

Assuming that the first toll link 800 is idle when the first link relay R610 in the link allotter 600 is operated, the answer hold relay R840 in the first toll link 800 occupies its restored position and the previously mentioned test circuit, including the test conductor C602, is completed in order to complete a circuit for energizing the upper winding of the link select relay R580 in the ink control equipment 500. The above-mentioned test circuit extends from the grounded conductor C813 in the control cable 501 by way of the contacts 849 of the restored answer hold relay R840 in the first toll link 800, C692, the contacts 612 of the operated first link relay R610 in the link allotter 600, the test conductor C602 and the upper winding of R580 to battery. When this test circuit is completed the upper winding of the link select relay R580 in the link control equipment 500 is energized in order to cause the latter relay to operate. Upon operating, the link select relay R580 interrupts, at the contacts 584, the previously traced path for applying ground potential to the conductor C604 extending to the link allotter 600, thereby to arrest further operation of the pulse relays R670 and R680 in the link allotter 600. Also the link select relay R580 completes, at the contacts 585, an obvious path, including the contacts 526 and 576, for applying ground potential to the conductor C601 extending to the link allotter 600. The application of ground potential to the conductor C601 completes a circuit, including the contacts 611 of the operated first link relay R610 in the link allotter 600 and C691, for energizing in series the lower windings of the start relays R860 and R870 in the first toll link 800, thereby to cause the latter relays to operate. Upon operating, the start relay R870 completes, at the contacts 874, an obvious holding circuit, including the grounded conductor C812 in the control cable 501, for energizing the upper winding thereof; and completes, at the contacts 873, an obvious holding circuit, including the grounded conductor C811 in the control cable 501, for energizing the upper winding of the start relay R860. Also, upon operating, the link select relay R580 interrupts, at the contacts 584, the previously traced circuit for energizing the upper winding of the pulse control relay R550, thereby to cause the latter relay to restore.

Upon restoring, the pulse control relay R550 interrupts, at the contacts 551, the previously traced circuit for energizing the winding of the impulse relay R920 in the by-pass switch 900, thereby to cause the latter relay to restore. Also the pulse control relay R550 interrupts, at the contacts 552 and 555, an obvious hold connection between the impulse conductor C605 extending to the link allotter 600 and the line conductors C301 and C302 of the control trunk 300; and completes, at the contacts 553 and 556, the previously traced original connection between the line conductors C301 and C302 of the control trunk 300 and the by-pass switch 900. Further the control pulse relay R550 interrupts, at the contacts 557, the previously traced original circuit for energizing the winding of the dial relay R930 in the by-pass switch 900; however, at this time, an alternative circuit is completed for energizing in series the upper winding of the pulse relay R365 at the control operator position 22 in the central office 21 and the winding of the dial relay R930 in the by-pass switch 900 in the remote office 31. The above-mentioned circuit extends from ground by way of the upper winding of R365, the contacts 364, the winding 324 of the repeater 320, the line conductor C302 of the control trunk 300, the winding 503 of the repeater 501, the contacts 556 and 573, and the winding of R930 to battery. Accordingly, the pulse relay R365 and the dial relay R930 are retained in their operated positions.

Upon restoring, the impulse relay R920 in the by-pass switch 900 completes, at the contacts 923, a circuit, including the contacts 933, 956 and 582, for energizing the winding of the control relay R560, thereby to cause the latter relay to operate. Upon operating, the control relay R560 interrupts, at the contacts 561, the previously traced path for applying ground potential to the conductor C811 in the control cable 501, thereby to interrupt the previously traced holding circuit for energizing the upper winding of the start relay R860 in the first toll link 800; however, the latter relay does not restore due to the completed operating circuit for energizing the lower winding thereof at this time. Also the control relay R560 interrupts, at the contacts 562, a further point in the previously mentioned circuit, including the supervisory conductor C806 in the control cable 501, for energizing the winding of the supervisory relay R510; and completes, at the contacts 563, a holding circuit, including the resistor 508 and the contacts 583, for energizing the lower winding of the link select relay R580. Further the control relay R560 completes, at the contacts 565, an obvious multiple path for applying ground potential to the conductor C601 extending to the link allotter 600, thereby positively to retain completed the previously traced series operating circuit for energizing the lower windings of the start relays R860 and R870 in the first toll link 800. Further the control relay R560 completes, at the contacts 566, an obvious path for applying ground potential to the conductor C606 extending to the link allotter 600, thereby to complete an obvious holding circuit, including the resistor 686, for energizing the lower winding of the operated first link relay R610.

In view of the foregoing explanation of the mode of operation of the pulse relays R670 and R680 in the link allotter 600 to cause the toll links in the associated group to be tested successively and to transmit over the impulse conductor C605 corresponding and successive battery impulses to the upper winding of the pulse relay R365 at the control operator position 22 in the central office 21, it will be understood that the pulse relay R365 first operates and then restores a number of times and finally reoperates; whereby the number of restorations of the pulse relay R365 corresponds to the toll link in the group in the remote office 31 which is to be utilized to extend the present connection. Considering the operation of the apparatus at the control operator position 22 in greater detail, it is noted that when the pulse relay R365 first operates it completes, at the contacts 366, a circuit, including the contacts 334 of the trunk listening key K333, for energizing the winding of the hold relay R370, thereby to cause the latter relay to operate. Upon operating, the hold relay R370 completes, at the contacts 373, a circuit, including the contacts 334 of the trunk listening key K333 and the contacts 398, etc., and 383, for energizing the lower winding of the control relay R375, thereby to cause the latter relay to operate. Upon operating, the control relay R375 prepares, at the contacts 376, a holding circuit traced hereinafter for energizing the upper winding thereof; and prepares, at the contacts 377, a circuit traced hereinafter for energizing the lower winding of the first signal relay R380.

Subsequently, when the pulse relay R365 restores it completes, at the contacts 367, the previously mentioned holding circuit, including the contacts 334 of the trunk listening key K333, the contacts 371 and 376 and the resistor 374, for energizing the upper winding of the control relay R375. Also, upon restoring, the pulse relay R365 completes, at the contacts 367, the previously mentioned circuit, including the contacts 334 of the trunk listening key K333 and the contacts 372 and 377, for energizing the lower winding of the first signal relay R380, thereby to cause the latter relay to operate. Upon operating, the first signal relay R380 completes, at the contacts 381, an obvious holding circuit for energizing the upper winding thereof; interrupts, at the contacts 383, the previously traced operating circuit for energizing the lower winding of the control relay R375; and completes, at the contacts 382, an obvious holding circuit for energizing the lower winding thereof. Further the first signal relay R380 prepares, at the contacts 384, a circuit traced hereinafter for energizing the lower winding of the second signal relay R385.

When the pulse relay R365 then reoperates it recompletes, at the contacts 366, the previously traced circuit for energizing the winding of the hold relay R370, thereby to retain the latter relay in its operated position; the hold relay R370 being of the slow-to-release type does not restore during pulsing. Also, upon reoperating, the pulse relay R365 interrupts, at the contacts 367, the previously traced multiple holding circuits for energizing the upper windings of the control relay R375 and the first signal relay R380, thereby to cause the control relay R375 to restore. However, the first signal relay R380 does not restore due to the previously traced completed holding circuit for energizing the lower winding thereof. In view of the foregoing explanation of the mode of operation of the pulse relay R365 in conjunction with the control relay R375 and the first signal relay R380, it will be understood that the signal relays R380, R385, R390 and R395 are operated and restored sequentially in response to repeated restorations of the pulse relay R365. In the present example, the pulse relay R365 is restored only once, as previously explained, due to the fact that the first toll link 800 in the group in the remote office 31 is to be utilized in extending the present call. Accordingly, at the conclusion of the operation of the pulse relay R365, the first signal relay R380 occupies its operated position. The operated first signal relay R380 completes, at the contacts 386, an obvious circuit for illuminating the first link indicating lamp L351. The illumination of the first link indicating lamp L351 indicates to the operator at the control operator position 22 that the first link in the group in the remote office 31 will be utilized in extending the present call.

Returning now to the operation of the first toll link 800 incident to the operation of the start relays R860 and R870 therein, it is noted that, upon operating, the start relay R860 completes, at the contacts 863', a circuit, including the contacts 846 and 827 and the grounded conductor C808 in the control cable 501, for energizing the magnet M826 of the answer switch 820. When thus energized the magnet M826 operates to interrupt, at the contacts 827, the previously traced operating circuit therefor, and to condition the wipers noted of the answer switch 820 to be driven one step in the counterclockwise direction. Accordingly, the magnet M826 operates and restores intermittently, thereby to drive the wipers noted of the answer switch 820 step by step in the counterclockwise direction until the trunk 460 extending to the calling C. L. R. trunk circuit 440 is found thereby.

When the answer switch 820 finds the trunk 460 extending to the calling C. L. R. trunk circuit 440 the previously mentioned circuit for energizing the upper winding of the stop relay R590 in the link control equipment 500 is completed. More particularly, a series circuit is completed for energizing the winding of the seizure relay R490 in the calling C. L. R. trunk circuit 440 and the upper winding of the stop relay R590 in the link control equipment 500, this circuit extending from ground by way of the contacts 535, 546 and 545, the upper winding of R590, the conductor C805 in the control cable 501, the contacts 867, the wiper 823 of the answer switch 820 and the engaged contact in the associated contact bank, the control conductor C463 of the trunk 460 extending to the calling C. L. R. trunk circuit 440, the contacts 488 and the winding of R490 to battery. When this series circuit is completed the stop relay R590 in the link control equipment 500 operates exceedingly fast as the latter relay is of the polarized type, as previously mentioned. Upon operating, the stop relay R590 interrupts, at the contacts 591, the previously traced circuit for energizing the magnet M826 of the answer switch 820, thereby positively to arrest further operation of the answer switch 820 at this time. Further the stop relay R590 completes, at the contacts 592, an obvious path for applying battery potential by way of the resistor 509 to the conductor C807 in the control cable 501, thereby to complete obvious multiple circuits for energizing the windings of the answer hold relay R840 in the first toll link 800 and the answer pilot relay R710 in the link control equipment 500, whereby the relays mentioned operate.

Upon operating, the answer hold relay R840 in the first toll link 800 interrupts, at the contacts 846, a further point in the previously traced circuit for energizing the magnet M826 of the answer switch 820; and completes, at the contacts 845, a holding circuit, including the resistor 847 and the contacts 827, for energizing the winding thereof in series with the magnet M826 of the answer switch 820. When this series holding circuit is completed the answer hold relay R840 is retained in its operated position; however, the magnet M826 of the answer switch 820 does not operate due to the high series resistance of the winding of the answer hold relay R840. Also the answer hold relay R840 interrupts, at the contacts 849, the previously traced test circuit, including the test conductor C602 extending to the link allotter 600, for energizing the upper winding of the link select relay R580 in the link control equipment 500; however, the latter relay remains in its operated position due to the completed holding circuit for energizing the lower winding thereof at this time. Also the answer hold relay R840 interrupts, at the contacts 849, the connection extending to the grounded conductor C813 in the control cable 501, thereby to mark the first toll link 800 as busy to the link allotter 600, in the manner previously explained. Further the answer hold relay R840 interrupts, at the contacts 848, the previously traced connection between the conductor C816 and the start conductor C817; thereby to interrupt the multiple between the conductor C816 and the start conductor C817 in the first toll link 800, the conductors mentioned being connected together in other idle ones of the toll links in the group, as previously explained. Also the answer hold relay R840 completes, at the contacts 843, a direct ground circuit substantially identical to that previously traced for energizing the winding of the seizure relay R490 in the calling C. L. R. trunk circuit 440, thereby to cause the latter relay to operate.

Upon operating, the seizure relay R490 in the calling C. L. R. trunk circuit 440 interrupts, at the contacts 491, the previously traced path for returning ring-back tone current over the C. L. R. trunk 450 to the calling subscriber substation T1 in order to indicate to the subscriber thereat that the call is being handled. Also the seizure relay R490 completes, at the contacts 492, an obvious multiple path for applying ground potential to the control conductor C453 of the C. L. R. trunk 450, thereby to retain the latter trunk marked as busy to the local connectors having access thereto. Further the seizure relay R490 completes, at the contacts 493, an obvious holding circuit, including the grounded control conductor C463 of the trunk 460, for energizing the winding thereof; and interrupts, at the contacts 494, the previously traced path for connecting battery potential by way of the resistor 497 to the control conductor C463 of the trunk 460. Further the seizure relay R490 interrupts, at the contacts 496, the previously mentioned path for applying ground potential to the conductor C401, thereby to interrupt a further point in the previously traced path for applying ground potential to the start conductor C817.

Further the answer hold relay R840 in the first toll link 800 completes, at the contacts 841 and 842, a connection between the repeater 470 in the C. L. R. trunk circuit 440 and the repeater 501 in the link control equipment 500. This connection extends from the line conductor C461 of the trunk 460 by way of the wiper 821 of the answer switch 820 and the engaged contact in the associated contact bank, the contacts 841 and 862, the line conductor C802 in the control cable 501, the contacts 753, the windings 505 and 504 of the repeater 501, the contacts 751, the line conductor C804 in the control cable 501, the contacts 865 and 842, and the wiper 822 of the answer switch 820 and the engaged contact in the associated contact band to the line conductor C462 of the trunk 460; the line conductors C461 and C462 of the trunk 460 being connected together by way of the windings 473 and 474 of the repeater 470 and the condenser 476.

Finally the answer hold relay R840 completes, at the contacts 843, a path, including the contacts 867, the conductor C805 in the control cable 501 and the contacts 545, 556 and 535, for short-circuiting the upper winding of the stop relay R590 in the link control equipment 500, thereby to cause the latter relay to restore. Upon operating, the answer pilot relay R710 in the link control equipment 500 interrupts, at the contacts 711, the previously traced holding circuit for energizing the winding of the hold relay R540, thereby to cause the latter relay to restore. Also the answer pilot relay R710 completes, at the contacts 712, an obvious circuit for energizing the winding of the answer pilot slave relay R720, thereby to cause the latter relay to operate.

Upon restoring, the hold relay R540 interrupts, at the contacts 547, the previously traced path for applying ground potential to the conductor C603 extending to the link allotter 600, thereby to interrupt the previously traced holding circuit for energizing the upper winding of the first link relay R610 in the link allotter 600; however, the latter relay does not restore at this time due to the completed holding circuit for energizing the lower winding thereof. Also the hold relay R540 interrupts, at the contacts 546, the previously traced circuit for energizing the lower winding of the stop relay R590.

At this time the illuminated call lamp L326 and the illuminated link indicating lamp L351 at the control operator position 22 indicate to the operator thereat that a call is awaiting attention and that the call utilizes the first toll link in the group in the remote office 31. In order to answer the call, the operator at the control operator position 22 operates the link listening key K333 in order to interruupt, at the contacts 334 thereof, the previously traced holding circuit for energizing the lower winding of the first signal relay R380, thereby to cause the latter relay to restore and extinguish the first link indicating lamp L351. Also when the trunk listening key K333 is thus operated there is completed, at the contacts 335 thereof, an obvious circuit for energizing the winding of the cut-in relay R360, thereby to cause the latter relay to operate shortly thereafter, the cut-in relay R360 being of the slow-to-operate type. Upon operating, the cut-in relay R360 completes, at the contacts 368, an alternative holding circuit, including the contacts 338 of the trunk supervisory key K336 and the contacts 366, for energizing the winding of the hold relay R370, thereby to retain the latter relay in its operated position. Further the cut-in relay R360 interrupts, at the contacts 367, the previously traced holding circuit for energizing the upper winding of the call relay R355, thereby to cause the latter relay to restore and extinguish the call lamp L326. Further the cut-in relay R360 completes, at the contacts 363, an alternative circuit for energizing the upper winding of the pulse relay R365; this circuit extending from ground by way of the upper winding of R365, the contacts 330 of the wipeout key K329, the contacts 342 of the dial key K339, the contacts of the ring call key K343, the contacts 346 of the release trunk key K344, and the contacts 363 to the winding 324 of the repeater 320; and therefrom by way of the previously traced path, including the winding of the dial relay R930 in the by-pass switch 900, to battery. Further the cut-in relay R360 completes, at the contacts 365, a circuit for energizing the lower winding of the pulse relay R365 at the control operator position 22 in series with the winding of the impulse relay R920 in the by-pass switch 900. The above-mentioned circuit extends from ground by way of the lower winding of R365, the contacts of the ring answer key K328, the contacts 337 of the trunk supervisory key K336, the contacts 340 of the dial key K339, the contacts 345 of the release trunk key K344, the contacts 348 of the error release key K347, the contacts 365, the winding 323 of the repeater 320, the line conductor C301 of the control trunk 300, the winding 502 of the repeater 501, the contacts 531 and 553, and the winding of R920 to battery. When this series circuit is completed the pulse relay R365 is retained in its operated position and the impulse relay R920 operates. Further the cut-in relay R360 interrupts, at the contacts 364, the previously traced original circuit for energizing the upper winding of the pulse relay R365 in series with the winding of the dial relay R930; and interrupts, at the contacts 366, a further point in the previously traced circuit for energizing the lower winding of the call relay R355. Finally the cut-in relay R360 completes, at the contacts 361 and 362, an obvious operative connection between the windings 321 and 322 of the repeater 320 and the windings 312 and 313 of the repeater 310.

Upon operating, the impulse relay R920 in the by-pass switch 900 interrupts, at the contacts 923, the previously traced circuit for energizing the winding of the control relay R560, thereby to cause the latter relay to restore shortly thereafter, the control relay R560 being of the slow-to-release type. Upon restoring, the control relay R560 recompletes, at the contacts 561, the previously traced holding circuit for energizing the upper winding of the start relay R860 in the first toll link 800. Also the control relay R560 prepares, at the contacts 562, a point in the previously mentioned circuit, including the supervisory conductor C806 in the control cable 501, for energizing the winding of the supervisory relay R510; and interrupts, at the contacts 563, the previously traced holding circuit for energizing the lower winding of the link select relay R580, thereby to cause the latter relay to restore shortly thereafter, the link select relay R580 being of the slow-to-release type. Finally the control relay R560 interrupts, at the contacts 566, the previously mentioned path for applying ground potential to the conductor C506 extending to the link allotter 600; thereby to interrupt the previously traced holding circuit for energizing the lower winding of the first link relay R610 in the link allotter 600, whereupon the latter relay restores. At this time the link allotter 600 is completely released; the by-pass switch 900 is operatively connected to the link control equipment 500 and is in readiness to be operated; and an operative connection is completed between the calling subscriber substation T1 in the remote office 31 and the control operator position 22 in the central office 21. More particularly, the calling subscriber substation T1 is operatively connected by way of the subscriber line 36, the local finder 32, the local connector 33 and the C. L. R. trunk 450 to the repeater 470 in the C. L. R. trunk circuit 440; the repeater 470 in the C. L. R. trunk circuit 440 is operatively connected by way of the previously traced path, including the trunk 460 and the first toll link 800, to the repeater 501 in the link control equipment 500; the repeater 501 in the link control equipment 500 is operatively connected by way of the previously traced path, including the control trunk 300, to the repeater 320 at the control operator position 22 in the central office 21; and the repeater 320 is operatively connected to the repeater 310 in the central office 21. Finally the transmitter at the control operator position 22 is operatively connected by way of the impedance 318 and the condenser 317 to the winding 311 of the repeater 310; while the receiver 315 at the control operator position 22 is operatively connected by way of the condenser 316 to the winding 313 of the repeater 310. Accordingly, at this time, the subscriber at the calling subscriber substation T1 in the remote office 31 advises the operator at the control operator position 22 in the central office 21 concerning the extension of the call.

*Extension of a call to the distant office*

Assume that the call initiated at the calling subscriber substation T1 in the remote office 31 and extended by way of the subscriber line 36, the local finder 32, the local connector 33, the C. L. R. trunk 450, the C. L. R. trunk circuit 440, the trunk 460, the first toll link 800, the control cable 501, the link equipment 500 and the control trunk 300 to the control operator position 22 in the central office 21 is to be extended to the toll operator position 42 in the distant office 41, in view of the instruction received by the operator at the control operator position 22 from the subscriber at the calling subscriber substation T1. The operator at the control operator position 22 in the central office 21 initiates the extension of the call by operating the dial key K339. When the dial key K339 is thus operated there is completed, at the contacts 341 thereof, an alternative circuit for energizing the winding of the impulse relay R920 in the by-pass switch 900, the last-mentioned circuit including the dial 327, the contacts 345 of the release trunk key K344, the contacts 348 of the error release key K347, the contacts 365, the winding 323 of the repeater 320, the line conductor C301 of the control trunk 300, the winding 502 of the repeater 501, and the contacts 531 and 553. Accordingly, at this time, the dial 327 is operatively connected to the impulse relay R920 in the by-pass switch 900. Also when the dial key K339 is thus operated there is interrupted, at the contacts 340 thereof, the previously traced original circuit for energizing the lower winding of the pulse relay R365 at the control operator position 22 in series with the winding of the impulse relay R920 in the by-pass switch 900; and there is interrupted, at the contacts 342 thereof, the previously traced series circuit for energizing the upper winding of the pulse relay R365 at the control operator position 22 and the winding of the dial relay R930 in the by-pass switch 900, thereby to cause the pulse relay R365 and the dial relay R930 to restore. Upon restoring, the pulse relay R365 interrupts, at the contacts 366, the previously traced holding circuit for energizing the winding of the hold relay R370, thereby to cause the latter relay to restore shortly thereafter, the hold relay R370 being of the slow-to-release type.

Upon restoring, the dial relay R930 completes, at the contacts 932, the previously traced circuit for energizing the winding of the hold relay R940, thereby to cause the latter relay to operate and complete, at the contacts 942, the previously traced original circuit for energizing the winding of the cutoff relay R570 and the lower winding of the stop relay R730 in multiple.

The operator at the control operator position 22 then proceeds to dial the first digit over the line conductor C301 of the control trunk 300 to the impulse relay R920 in the by-pass switch 900, whereby the latter relay follows the impulses of the digit dialed. The first time the impulse relay R920 restores it interrupts, at the contacts 922, the previously traced circuit for energizing the winding of the hold relay R940; and completes, at the contacts 923, a circuit, including the contacts 934, 943 and 953, for energizing the winding of the series relay R960 in series with the vertical magnet M916 of the Strowger mechanism 910. When this series circuit is completed the series relay R960 operates and the vertical magnet M916 operates to drive the wiper set of the Strowger mechanism 910 one step in the vertical direction. When the wiper set of the Strowger mechanism 910 is driven one step in the vertical direction the set of switch springs S919 is operated, thereby to complete an obvious circuit for energizing the lower winding of the control relay R950. When thus energized the control relay R950 operates to complete, at the contacts 951, an alternative circuit, including the contacts 923, 934, 943, 957 and 963, for energizing the winding of the series relay R960 in series with the vertical magnet M916; and to prepare, at the contacts 954 and 955, a holding circuit, including the contacts 923 and 933, for energizing the upper winding thereof. The first time the impulse relay R920 reoperates it recompletes, at the contacts 922, the previously traced circuit for energizing the winding of the hold relay R940; and interrupts, at the contacts 923, the previously traced series circuit for energizing the winding of the series relay R960 and the vertical magnet M916. It is noted that the hold relay R940 and the series relay R960 are of the slow-to-release type and do not restore during impulsing. At the conclusion of the first digit the wiper set of the Strowger mechanism 910 occupies a vertical level corresponding to the digit dialed.

The subsequent operation of the by-pass switch 900 depends upon whether it is arranged for one-digit or two-digit automatic trunk hunting operation in the level occupied by the wiper set of the Strowger mechanism 910. First assuming that the Strowger mechanism 910 is arranged for one-digit automatic trunk selection with respect to the selected level, the set of switch springs S920 is operated when the wiper set of the Strowger mechanism 910 is operated to the selected level. When the set of switch springs S920 is thus operated there is completed an obvious circuit, including the contacts 962, for energizing the winding of the control relay R965, thereby to cause the latter relay to operate. Shortly following the conclusion of the first digit the series relay R960 restores. Upon restoring, the series relay R960 interrupts, at the contacts 962, the previously traced circuit for energizing the winding of the control relay R965. However, the latter relay does not restore immediately as it is of the slow-to-release type. Also the series relay R960 completes, at the contacts 961, a circuit, including the set of switch springs S920 and the contacts 966, for energizing the winding of the series relay R970 in series with the rotary magnet M917 of the Strowger mechanism 910. When thus energized the series relay R970 operates to complete, at the contacts 972, an obvious circuit for energizing the winding of the control relay R975, thereby to cause the latter relay to operate; and when the rotary magnet M917 is thus energized it operates to drive the wiper set of the Strowger mechanism 910 one step in the rotary direction. Upon operating, the control relay R975 completes, at the contacts 977, an obvious holding circuit, including the contacts 952, for energizing the winding thereof. Subsequently, the control relay R965 restores, thereby to interrupt, at the contacts 966, the previously traced series circuit for energizing the winding of the series relay R970 and the rotary magnet M917; thereby to cause the series relay R970 to restore shortly thereafter, the series relay R970 being of the slow-to-release type.

Upon restoring, the series relay R970 completes, at the contacts 971, a test circuit, including the test wiper 913, for the test relay R990 and the step relay R980. In the event the selected trunk is busy, ground potential appears upon the control conductor thereof and is applied to the test wiper 913 of the wiper set of the Strowger mechanism 910. The application of ground potential to the wiper 913 completes a path, including the contacts 993, 971, 976 and 952, for short-circuiting the winding of the test relay R990, thereby positively to prevent operation of the latter relay at this time. Also the application of ground potential to the wiper 913 completes a circuit, including the contacts 993 and 917, for energizing the winding of the step relay R980, thereby to cause the latter relay to operate. Upon operating, the step relay R980 completes, at the contacts 981, a holding circuit, including the contacts 942 and 917, for energizing the winding thereof; and completes, at the contacts 982, a circuit, including the contacts 973 and 995, for energizing the rotary magnet M917. When thus energized the rotary magnet M917 operates in order to drive the wiper set of the Strowger mechanism 910 an additional step in the rotary direction; and to interrupt, at the contacts 917, the previously traced holding circuit for energizing the winding of the step relay R980, whereby the latter relay restores. Upon restoring, the step relay R980 interrupts, at the contacts 982, the above-traced circuit for energizing the rotary magnet M917, thereby to cause the latter magnet to restore. At this time the test relay R990 and the step relay R980 test the idle or busy condition of the selected trunk, in the manner described above.

Now assuming that the trunk selected by the wiper set of the Strowger mechanism 910 is idle, battery potential appears upon the control conductor thereof and is applied to the test wiper 913. The application of battery potential to the test wiper 913 completes a circuit substantially identical to that traced above for short-circuiting the winding of the step relay R980, thereby positively to prevent operation of the latter relay. Also the application of battery potential to the wiper 913 completes a circuit substantially identical to that traced above for energizing the winding of the test relay R990, thereby to cause the latter relay to operate. Upon operating, the test relay R990 interrupts, at the contacts 993, a common point in the above-mentioned path for short-circuiting the winding of the step relay R980 and in the above-mentioned circuit for energizing the winding of the test relay R990. Further the test relay R990 interrupts, at the contacts 995, a point in the previously traced circuit for energizing the rotary magnet M917; and completes, at the contacts 994, an obvious path, including the contacts 952, for applying ground potential to the test wiper 913, for a purpose more fully explained hereinafter. Also, at this time, a series holding circuit, including the contacts 952, 976, 971 and 917, is completed for energizing the winding of the test relay R990 and the winding of the step relay R980. When this series holding circuit is completed the test relay R990 is retained in its operated position; however, the step relay R980 does not operate due to the high series resistance of the winding of the test relay R990.

Now assuming that the Strowger mechanism 910 is arranged for two-digit automatic trunk selection in the selected level, in this event the set of switch springs S920 is not operated. Accordingly, shortly following the conclusion of the first digit the series relay R960 restores, in the manner previously explained; however, neither the control relay R965 nor the series relay R970 is operated at this time. In this case, upon restoring, the series relay R960 prepares, at the contacts 964, an alternative circuit traced hereinafter for energizing the winding of the series relay R970 in series with the rotary magnet M917. In this case the operator at the control operator position 22 proceeds to dial the second digit, whereupon the impulse relay R920 again follows. The first time the impulse relay R920 restores during the second digit it completes, at the contacts 923, the previously mentioned circuit, including the contacts 934, 943, 957, 964 and 995, for energizing the winding of the series relay R970 in series with the rotary magnet M917; whereupon the series relay R970 operates in order to effect operation of the control relay R975, in the manner previously explained. Also the rotary magnet M917 operates in order to drive the wiper set of the Strowger mechanism 910 one step in the rotary direction. At the conclusion of the second digit the wiper set of the Strowger mechanism 910 engages the selected contact set in the selected level and shortly thereafter the series relay R970 restores. Upon restoring, the series relay R970 completes, at the contacts 971, the previously traced test circuit, including the test wiper 913 of the wiper set of Strowger mechanism 910 and the winding of the test relay R990. At this time the test relay R990 and the step relay R980 operate, in the manner previously explained, whereby the remainder of the trunks in the level are successively tested in order to cause the wiper set of the Strowger mechanism 910 to seize an idle trunk in the selected level, in the manner described above.

Assume that the wiper set of the Strowger mechanism 910 seizes the trunk 415 in the selected level, the trunk 415 extending to the toll line circuit 400 terminating the toll line 410 which, in turn, extends to the distant office 41. At this time the test relay R990 operates, as previously noted. Upon operating, the test relay R990 completes, at the contacts 991 and 992, an obvious connection between the windings 504 and 505 of the repeater 501 and the line wipers 911 and 912 of the wiper set of the Strowger mechanism 910; and prepares, at the contacts 997, a circuit traced hereinafter for energizing the upper winding of the stop relay R730, the last-mentioned circuit including the control wiper 914 of the wiper set of the Strowger mechanism 910. Further the test relay R990 completes, at the contacts 996, an obvious circuit for energizing the winding of the call start relay R740, thereby to cause the latter relay to operate. Upon operating, the call start relay R740 completes, at the contacts 741, a path, including the contacts 731 and 722, for applying ground potential to the conductor C809 in the control cable 501; whereby a circuit, including the grounded conductor C809 and the contacts 872, 886 and 837, is completed for energizing the magnet M836 of the call switch 830. When thus energized the magnet M836 operates in order to condition the wipers noted of the call switch 830 to be driven one step in the clockwise direction; and to interrupt, at the contacts 837, the circuit for energizing the magnet M836. Accordingly, the magnet M836 operates intermittently, thereby to drive the wipers noted of the call switch 830 step by step in the clockwise direction until the call switch 830 finds the trunk 415 extending to the toll line circuit 400. More particularly, when the wiper 834 of the call switch 830 engages the contact in the associated contact bank terminating the control conductor C419' of the trunk 415 a circuit is completed for energizing the upper winding of the stop relay R730 in the link control equipment 500, this circuit extending from ground by way of the contacts 871 and 884, the wiper 834 of the call switch 830 and the engaged contact in the associated contact bank, the control conductor C419' of the trunk 415, the control wiper 914 of the wiper set of the Strowger mechanism 910, the contacts 997 and 727, and the upper winding of R730 to battery. When thus energized the stop relay R730 operates exceedingly fast, this relay being of the polarized type, as previously noted.

Upon operating, the stop relay R730 interrupts, at the contacts 731, the previously traced circuit, including the conductor C809 in the control cable 501, for energizing the magnet M836 of the call switch 830, thereby positively to arrest further operation of the latter magnet at this time. Also the stop relay R730 completes, at the contacts 732, an obvious path, including the contacts 741 and 723, for applying ground potential to the conductor C814 in the control cable 501; thereby to complete an obvious circuit, including the grounded conductor C814 and the contacts 875, for energizing the lower winding of the call hold relay R880 in the first toll link 800. When thus energized the call hold relay R880 operates to interrupt, at the contacts 886, a further point in the previously traced circuit for energizing the magnet M836 of the call switch 830; and to complete, at the contacts 887, an obvious holding circuit, including the contacts 837 and the resistor 888, for energizing the upper winding of the call hold relay R880 in series with the magnet M836. When this series holding circuit is completed the call hold relay R880 is retained in its operated position; however, the magnet M836 does not operate due to the high series resistance of the upper winding of the call hold relay R880. Also, upon operating, the call hold relay R880 interrupts, at the contacts 884, the previously traced circuit for energizing the upper winding of the stop relay R730, thereby to cause the latter relay to restore. Further the call hold relay R880 interrupts, at the contacts 888, a further point in the bridge connection in the first toll link 800 between the conductor C816 and the start conductor C817, for the purpose previously explained. Further the call hold relay R880 completes, at the contacts 883, an obvious multiple path, including the wiper 833 of the call switch 830 and the engaged contact in the associated contact bank for applying ground potential to the control conductor C415 of the trunk 415, ground potential being previously applied to the control conductor C415 of the trunk 415 by way of the test wiper 913 in the by-pass switch 900, as previously noted. Finally the call hold relay R880 completes, at the contacts 881 and 882, a connection between the line conductors C416 and C417 of the trunk 415 and the windings 504 and 505 of the repeater 501. The last-mentioned connection extends from the line conductor C416 of the trunk 415 by way of the wiper 831 of the call switch 830 and the engaged contact in the associated contact bank, the contacts 881 and 861, the line conductor C801 in the control cable 501, the contacts 763, the windings 595 and 504 of the repeater 501, the contacts 761, the line conductor C803 in the control cable 501, the contacts 864 and 882, and the wiper 832 of the call switch 830 and the engaged contact in the associated contact bank to the line conductor C417 of the trunk 415. Hence, at this time, the repeater 501 is operatively connected both by way of the by-pass switch 900 and by way of the call switch 830 in the first toll link 800 in multiple to the line conductors of the trunk 415.

When ground potential is applied by way of the test wiper 913 of the Strowger mechanism 910 in the by-pass switch 900 to the control conductor C415 an obvious circuit, including the contacts 427, is completed for energizing the winding of the seizure relay R430 in the toll line circuit 400, thereby to cause the latter relay to operate. Upon operating, the seizure relay R430 completes, at the contacts 432, an obvious path, including the contacts 427, for applying ground potential by way of the control conductor C415 thereof to the control conductor C418 thereof; the application of ground potential to the control conductor C418 of the trunk 415 marking the latter trunk as busy to the answer switches of the toll links in the associated group. Also the seizure relay R430 interrupts, at the contacts 433, the normally completed path, including the contacts 427, for applying battery potential by way of the resistor 436 to the control conductor C415 of the trunk 415. Further the seizure relay R430 interrupts, at the contacts 431, a circuit traced hereinafter for energizing the upper winding of the line relay R420; interrupts, at the contacts 434, a circuit traced hereinafter for energizing the lower winding of the line relay R420 in series with the winding of the control relay R425; and interrupts at the contacts 435, a point in a path traced hereinafter for applying ground potential to the conductor C401 extending to the link control equipment 500. The line conductors C416 and C417 of the trunk 415 are directly connected to the line conductors C411 and C412 of the toll line 410. Accordingly, at this time, the control operator position 22 in the central office 21 is connected by way of the control trunk 300, the by-pass switch 900 and the call switch 830 of the first toll link 800 in multiple, the trunk 415 and the toll line circuit 400 to the toll line 410 extending to the toll operator position 42 in the distant office 41.

In the event the operator at the control operator position 22 in the central office 21 has made an error in extending the call to the toll operator position 42 in the distant office 41, she operates the error release key K347 while the dial key K339 occupies its operated position. When the error release key K347 is thus operated there is interrupted, at the contacts 348 thereof, the previously traced circuit for energizing the winding of the impulse relay R920 in the by-pass switch 900; and there is completed, at the contacts 349 thereof, a circuit substantially identical to that previously traced for energizing the winding of the dial relay R930 in the by-pass switch 900, whereby the impulse relay R920 restores and the dial relay R930 operates. Upon restoring, the impulse relay R920 completes, at the contacts 923, a holding circuit, including the contacts 933, 955 and 954, for energizing the upper winding of the control relay R950. Also the impulse relay R920 completes, at the contacts 923, a path, including the contacts 933 and 955, for applying ground potential to the release conductor C810 in the control cable 501. The application of ground potential to the release conductor C810 in the control cable 501 completes an obvious path, including the contacts 864', for short-circuiting the upper winding of the call hold relay R880, thereby to cause the latter relay to restore. Upon restoring, the call hold relay R880 interrupts, at the contacts 881 and 882, the previously traced connection between the trunk 415 extending to the toll line circuit 400 and the windings 504 and 505 of the repeater 501 in the link control equipment 500. Also, upon restoring, the impulse relay R920 interrupts, at the contacts 922, the previously traced circuit for energizing the winding of the hold relay R940, thereby to cause the latter relay to restore shortly thereafter and completes, at the contacts 941, an obvious circuit, including the contacts 951, for energizing the release magnet M918. When thus energized the release magnet M918 operates in order to release the wiper set of the Strowger mechanism 910 and to cause it to be returned to its normal position. When the wiper set of the Strowger mechanism 910 is thus released the set of switch springs S919 is operated, thereby to interrupt the previously traced circuit for energizing the lower winding of the control relay R950; however, the latter relay is retained in its operated position due to the completed above-traced circuit for energizing the upper winding thereof.

The operator at the control operator position 22 in the central office 21 then restores the error release key K347, thereby to recomplete, at the contacts 348 thereof, the previously traced circuit for energizing the winding of the impulse relay R920 in the by-pass switch 900 and to interrupt, at the contacts 349 thereof, the previously traced circuit for energizing the winding of the dial relay R930 in the by-pass switch 900; whereby the impulse relay R920 reoperates and the dial relay R930 restores. Upon reoperating, the impulse relay R920 interrupts, at the contacts 923, the previously traced holding circuit for energizing the upper winding of the control relay R950, thereby to cause the latter relay to restore. Upon restoring, the control relay R950 interrupts, at the contacts 952, the previously traced multiple holding circuits for energizing the windings of the control relay R975 and the test relay R990, thereby to cause the latter relays to restore. At this time the by-pass switch 900 is completely released and is in readiness to be reoperated under the control of the dial 327 at the control operator position 22. Also, upon restoring, the control relay R950 interrupts, at the contacts 959, the previously traced circuit for energizing the winding of the answer split relay R750; thereby to cause the latter relay to restore shortly thereafter in order to recomplete, at the contacts 751 and 753, the previously traced connection between the line conductors of the trunk 460 and the windings 504 and 505 of the repeater 501 in the link control equipment 500. Also when the wiper set of the Strowger mechanism 910 is released the previously traced circuit for energizing the upper winding of the stop relay R730 is interrupted, thereby to cause the latter relay to restore. At this time the link control equipment 500 is in readiness to be controlled in response to reoperation of the by-pass switch 900, in the manner previously explained. The operator at the control operator position 22 in the central office 21 then proceeds to extend the connection, in the manner described above.

Continuing now with the operation of the link control equipment 500 subsequent to the extension of the call over the toll line 410 to the toll operator position 42 in the distant office 41, in the manner explained above, the operator at the control operator position 22 in the central office 21 then restores the dial key K339; thereby to interrupt, at the contacts 341 thereof, the previously traced alternative circuit, including the dial 327, for energizing the impulse relay R920 in the by-pass switch 900. Also, at the contacts 340 of the dial key K339, the previously traced original circuit for energizing the lower winding of the pulse relay R365 in series with the winding of the impulse relay R920 is completed, thereby to retain the impulse relay R920 in its operated position and to effect operation of the pulse relay R365, in the manner previously explained. Also, at the contacts 342 of the dial key K339, the previously traced alternative circuit for energizing the upper winding of the pulse relay R365 in series with the winding of the dial relay R930 in the by-pass switch 900 is recompleted, thereby to cause the dial relay R930 to reoperate. Upon reoperating, the pulse relay R365 recompletes, at the contacts 366, the previously traced holding circuit for energizing the winding of the hold relay R370, thereby to cause the latter relay to reoperate.

Upon operating, the dial relay R930 in the by-pass switch 900 interrupts, at the contacts 932, the previously traced circuit for energizing the winding of the hold relay R940; thereby to cause the latter relay to restore shortly thereafter, the hold relay R940 being of the slow-to-release type, as previously noted. Upon restoring, the hold relay R940 completes, at the contacts 941, an obvious circuit, including the contacts 951, for energizing the release magnet M918 of the Strowger mechanism 910; whereby the latter magnet operates and releases the wiper set of the Strowger mechanism 910, causing it to be returned to its normal position. When the wiper set of the Strowger mechanism 910 is thus released the set of switch springs S919 is operated, thereby to interrupt the previously mentioned circuit for energizing the lower winding of the control relay R950, whereupon the latter relay restores. Upon restoring, the control relay R950 interrupts, at the contacts 951, the previously traced circuit for energizing the release magnet M918 in order to cause the latter magnet to restore; and interrupts, at the contacts 952, the previously traced multiple holding circuits for energizing the windings of the control relay R915 and the test relay R990, thereby to cause the latter relays to restore. Upon restoring, the test relay R990 interrupts, at the contacts 996, the previously traced circuit for energizing the winding of the call start relay R740, thereby to cause the latter relay to restore. Upon restoring, the call start relay R740 interrupts, at the contacts 741, the previously traced circuit for energizing the lower winding of the call hold relay R880 in the first toll link 800; however, the latter relay does not restore at this time due to the completed holding circuit for energizing the upper winding thereof. Further the control relay R950 interrupts, at the contacts 959, a previously completed circuit for energizing the winding of the answer split relay R750; thereby to cause the latter operated relay to restore shortly thereafter, the answer split relay R750 being of the slow-to-release type. At this point it is noted that the answer split relay R750 was previously operated incident to the operation of the control relay R950 during the original operation of the by-pass switch 900. When the answer split relay R750 operated it interrupted, at the contacts 751 and 753, the previously traced connection between the line conductors C461 and C462 of the trunk 460 and the windows 504 and 505 of the repeater 501; thereby to prevent the various switching surges produced incident to the operation of the by-pass switch 900 from being returned over the trunk 460 and the previously traced connection, including the C. L. R. trunk circuit 440 and the C. L. R. trunk 450, to the calling subscriber substation T1. However, at this time, upon restoring, the split answer relay R750 recompletes, at the contacts 751 and 753, the previously traced connection between the line conductors C461 and C462 of the trunk 460 and the windings 504 and 505 of the repeater 501, whereby the calling subscriber substation T1 is again operatively connected to the repeater 501. Hence, at this time, the control operator position 22 in the central office 21 is operatively connected by way of the control trunk 300 and the link control equipment 500 to the first toll link 800; the first toll link 800 being connected by way of the answer switch 820, the trunk 460, the C. L. R. trunk circuit 440, the C. L. R. trunk 450, the local connector 33, the local finder 32 and the subscriber line 36 to the calling subscriber substation T1 in the remote office 31; and being connected by way of the call switch 830, the trunk 415 and the toll line circuit 400 to the toll line 410 extending to the toll operator position 42 in the distant office 41. At this time the Strowger mechanism 910 in the by-pass switch 900 is completely released.

The operator at the control operator position 22 then operates the ring call key K343, thereby to interrupt the previously traced circuit for energizing the upper winding of the pulse relay R365 in series with the winding of the dial relay R930 in the by-pass switch 900 in order to cause the dial relay R930 to restore. Upon restoring, the dial relay R930 recompletes, at the contacts 932, the previously traced circuit for energizing the winding of the hold relay R940, thereby to cause the latter relay to reoperate. Further the dial relay R930 completes, at the contacts 932, a circuit, including the contacts 922 and 953, for energizing the winding of the ring call relay R765. When thus energized the ring call relay R765 operates to complete, at the contacts 768, an obvious circuit for energizing the winding of the split call relay R760, thereby to cause the latter relay to operate. Upon operating, the split call relay R760 interrupts, at the contacts 761 and 763, the previously traced connection between the windings 504 and 505 of the repeater 501 and the line conductors of the toll line 410; and completes, at the contacts 762 and 764, a circuit for projecting ringing current over the line conductors of the toll line 410. The last-mentioned circuit extends from ground by way of the contacts 767 and 764 to the line conductor C801 in the control cable 501, and from the ringing conductor C769 by way of the contacts 766 and 762 to the line conductor C803 in the control cable 501; the line conductors C801 and C803 in the control cable 501 being connected by way of the call switch 830 of the first toll link 800 and the line conductors C416 and C417 of the trunk 415 to the line conductors C411 and C412 of the toll line 410, as previously traced.

The ringing current projected over the toll line 410 rings down the equipment at the toll operator position 42 in the distant office 41, thereby to indicate to the operator thereat that a toll call is waiting to be answered on the toll line 410. The operator at the control operator position 22 in the central office 21 then restores the ring call key K343, thereby to recomplete the previously traced circuit for energizing the upper winding of the pulse relay R365 in series with the dial relay R930 in the by-pass switch 900 in order to cause the dial relay R930 to reoperate. Upon reoperating, the dial relay R930 interrupts, at the contacts 932, the previously traced circuit for energizing the winding of the hold relay R940, thereby to cause the latter relay to restore shortly thereafter. Also the dial relay R930 interrupts, at the contacts 932, the previously traced circuit for energizing the winding of the ring call relay R765, thereby to cause the latter relay to restore. Upon restoring, the ring call relay R765 interrupts, at the contacts 768, the previously mentioned circuit for energizing the winding of the split call relay R760; thereby to cause the latter relay to restore shortly thereafter, the split call relay R760 being of the slow-to-release type. Also, upon restoring, the ring call relay R765 interrupts, at the contacts 766 and 767, the previously traced circuit for projecting ringing current over the toll line 410. Upon restoring, the split call relay R760 recompletes, at the contacts 761 and 763, the previously traced connection between the windings 504 and 505 of the repeater 501 and the toll line 410. When the operator at the toll operator position 42 in the distant office 41 answers the call a three-way communication connection is completed, including the toll operator position 42 in the distant office 41, the control operator position 22 in the central office 21 and the calling subscriber substation T1 in the remote office 31.

The operator at the control operator position 22 in the central office 21 then passes the directions concerning the extension of the call to the operator at the toll operator position 42 in the distant office 41 and monitors the connection until she determines that it has been established. In the event the subscriber at the calling subscriber substation T1 in the remote office 31 does not begin the conversation after the operator at the toll operator position 42 in the distant office 41 extends the connection the operator at the control operator position 22 in the central office 21 may ring the calling subscriber substation T1 by operating the ring answer key K328, thereby to interrupt the previously traced circuit for energizing the lower winding of the pulse relay R365 in series with the winding of the impulse relay R920 in the by-pass switch 900. The impulse relay R920 then restores to complete, at the contacts 923, a circuit, including the contacts 933, 956 and 581, for energizing the winding of the ring answer relay R745, thereby to cause the latter relay to operate. Upon operating, the ring answer relay R745 completes, at the contacts 748, an obvious circuit for energizing the winding of the split answer relay R750, thereby to cause the latter relay to operate. Upon operating, the answer split relay R750 interrupts, at the contacts 751 and 753, the previously traced connection between the trunk 460 extending to the C. L. R. trunk circuit 440 and the windings 504 and 505 of the repeater 501 in the link control equipment 500; and completes, at the contacts 752 and 754, a circuit for projecting ringing current over the line conductors of the trunk 460. The above-mentioned circuit extends from the ringing conductor C749 by way of the contacts 746 and 752 to the line conductors C804 in the control cable 501, and from ground by way of the contacts 747 and 754 to the line conductor C802 in the control cable 501; the line conductors C804 and C802 being connected by way of the previously traced path, including the answer switch 820 of the first toll link 800, to the line conductors C461 and C462 of the trunk 460, whereby the ringing current traverses the windings 473 and 474 of the repeater 470 in the C. L. R. trunk circuit 440. The ringing current traversing the windings 473 and 474 of the repeater 470 induces ringing voltage in the windings 471 and 472 thereof; whereby ringing current traverses the previously traced connection, including the C. L. R. trunk 450, the local connector 33, the local finder 32 and the subscriber line 36 in order to operate the ringer at the calling subscriber substation T1 in the remote office 31 is thus rung the operator at the control operator position 22 restores the ring answer key K328, thereby to recomplete the previously traced circuit for energizing the lower windings of the pulse relay R365 in series with the impulse relay R920 in the by-pass switch 900 in order to cause the impulse relay R920 to reoperate. Upon reoperating, the impulse relay R920 interrupts, at the contacts 923, the previously traced circuit for energizing the winding of the ring answer relay R745, thereby to cause the latter relay to restore. Upon restoring, the ring answer relay R745 interrupts, at the contacts 746 and 747, the previously traced circuit for projecting ringing current over the trunk 460 extending to the C. L. R. trunk circuit 440; and interrupts, at the contacts 748, the previously mentioned circuit for energizing the winding of the split answer relay R750, thereby to cause the latter relay to restore shortly thereafter. Upon restoring, the split answer relay R750 recompletes, at the contacts 751 and 753, the previously traced connection between the line conductors of the trunk 460 extending to the C. L. R. trunk circuit 440 and the windings 504 and 505 of the repeater 501.

After the operator at the central office 21 determines that the call has been extended and the subscriber at the calling subscriber substation T1 in the remote office 31 has begun the conversation she prepares the usual toll ticket and operates the release trunk key K344. When the release trunk key K344 is thus operated there is interrupted, at the contacts 345 thereof, the previously traced circuit for energizing the lower winding of the pulse relay R365 in series with the impulse relay R920 in the by-pass switch 900; and there is interrupted, at the contacts 346 thereof, the previously traced circuit for energizing the upper winding of the pulse relay R365 in series with the dial relay R930 in the by-pass switch 900, whereby the pulse relay R365, the impulse relay R920 and the dial relay R930 restore. Upon restoring, the pulse relay R365 interrupts, at the contacts 366, the previously traced holding circuit for energizing the winding of the hold relay R370, thereby to cause the latter relay to restore shortly thereafter. The operator at the control operator position 22 then restores the trunk listening key K333, thereby to interrupt, at the contacts 335 thereof, the previously traced circuit for energizing the winding of the cut-in relay R360, thereby to cause the latter relay to restore. At this time the equipment at the control operator position 22 is completely released and available for further use.

Upon restoring, the dial relay R930 interrupts, at the contacts 931, the previously traced multiple circuit for energizing the lower winding of the stop relay R730 and the winding of the cutoff relay R570; thereby to cause the cutoff relay R570 to restore shortly thereafter, the latter relay being of the slow-to-release type. Upon restoring, the cutoff relay R570 prepares, at the contacts 574, a point in the previously traced connection between the conductor C401 extending to the toll line circuits and to the C. L. R. trunk circuits, and the start conductor C817 extending to the link control equipment 500. Further the cutoff relay R570 interrupts, at the contacts 573, a further point in the circuit for energizing the winding of the dial relay R930 in the by-pass switch 900; and interrupts, at the contacts 571 and 572, the previously mentioned path for applying ground potential to the conductors C811 and C812, respectively, in the control cable 501. When ground potential is removed from the conductors C811 and C812 the previously traced holding circuits for respectively energizing the upper windings of the start relays R860 and R870 are interrupted, thereby to cause the latter relays to restore. Upon restoring, the start relay R860 interrupts, at the contacts 861 and 864, the previously traced connection between the line conductors of the trunk 415 and the windings 504 and 505 of the repeater 501; interrupts, at the contacts 862 and 865, the previously traced connection between the line conductors of the trunk 460 and the windings 504 and 505 of the repeater 501; and completes, at the contacts 863 and 866, an obvious direct connection between the line wipers 821 and 822 of the answer switch 820 and the line wipers 831 and 832 of the call switch 830. Accordingly, at this time, the trunk 860 extending to the C. L. R. trunk circuit 440 is connected by way of the first toll link 800 to the trunk 415 extending to the toll line circuit 400. Thus an operative connection is completed between the calling subscriber substation T1 in the remote office 31 and the toll operator position 42 in the distant office 41, including the first toll link 800 and excluding the link control equipment 500 and the control trunk 300 extending to the control operator position 22 in the central office 21.

*Supervision and release of an established connection*

It is noted that the established connection between the calling subscriber substation T1 in the remote office 31 and the called toll operator position 42 in the distant office 41, and routed by way of the C. L. R. trunk circuit 440, the toll line circuit 400 and the first toll link 800 in the remote office 31, is supervised by the operator at the control operator position 22 in the central office 21. The subscriber at the calling subscriber substation T1 in the remote office 31 may first initiate the release of the established connection by replacing the receiver of the telephone instrument thereat upon its associated switchhook, thereby to interrupt the previously traced circuit for energizing in series the upper and lower windings of the line relay R480 in the C. L. R. trunk circuit 440 in order to cause the latter relay to restore. Upon restoring, the line relay R480 interrupts, at the contacts 481, the previously mentioned circuit for energizing the winding of the control relay R485; thereby to cause the latter relay to restore shortly thereafter, the control relay R485 being of the slow-to-release type. Also the line relay R480 completes, at the contacts 482, an obvious path, including the contacts 495 and the resistor 484, for applying battery potential to the control conductor C464 of the trunk 460, thereby to complete a circuit, including the wiper 825 of the answer switch 820 and the engaged contact in the associated contact bank and the contacts 844 and 869, for energizing the lower winding of the supervisory relay R850 in the first toll link 800. When thus energized the supervisory relay R850 operates for a purpose more fully explained hereinafter.

On the other hand, the release of the established connection may be initiated at the toll operator position 42 in the distant office 41. In this event the operator at the toll operator position 42 operates the associated position equipment in order to cause ringing current to be projected over the toll line 410 and consequently over the line conductors C416 and C417 of the trunk 415, the line wipers 831 and 832 of the call switch 830 and the engaged contacts in the associated contact banks, the contacts 881, 882 and 863, 866, and the contacts 851 to the upper winding of the supervisory relay R850. When the supervisory relay R850 is thus energized it operates for a purpose more fully explained hereinafter.

More particularly, the supervisory relay R850 operates to complete, at the contacts 852, an obvious path for applying ground potential by way of the contacts 861' to the supervisory conductor C806 in the control cable 501. The application of ground potential to the supervisory conductor C806 in the control cable 501 completes a circuit, including the contacts 562, 543 and 523, for energizing the winding of the supervisory relay R510 in the link control equipment 500, in the event both the hold relay R540 and the control relay R560 in this equipment occupy their restored positions, as explained more fully hereinafter. When thus energized the supervisory relay R510 operates to complete, at the contacts 512, a circuit, including the contacts 755, for energizing the lower winding of the supervisory relay R520, thereby to cause the latter relay to operate. Upon operating, the supervisory relay R520 completes, at the contacts 522, an obvious holding circuit, including the grounded supervisory conductor C806 in the control cable 501, for energizing the upper winding thereof; whereby a series holding circuit substantially identical to that previously traced is completed for energizing the lower winding of the supervisory relay R850 in the first toll link 800 and the upper winding of the supervisory relay R520 in the link control equipment 500. Also the supervisory relay R520 interrupts, at the contacts 521, a further point in the previously traced circuit, including the start conductor C817, for energizing the winding of the answer start relay R530, thereby positively to prevent operation of the latter relay at this time. Further the supervisory relay R520 interrupts, at the contacts 523, the previously traced circuit for energizing the winding of the supervisory relay R510; thereby to cause the latter relay to restore shortly thereafter, the supervisory relay R510 being of the slow-to-release type. Further the supervisory relay R520 completes, at the contacts 527, a path, including the conductor C815 in the control cable 501 and the contacts 853, for applying ground potential to the conductor C693 extending to the link allotter 600, thereby to mark the first toll link 800 as the link requiring supervision.

Also, upon operating, the supervisory relay R510 completes, at the contacts 511, an alternative circuit for energizing the upper winding of the pulse relay R365; this circuit extending from ground by way of the upper winding of R365, the contacts 364, the winding 324 of the repeater 320, the line conductor C302 of the control trunk 300, the winding 503 of the repeater 501, the contacts 556 and 511, the impulse conductor C605, the contacts 683 and the resistor 685 to battery. When thus energized the pulse relay R365 operates to complete, at the contacts 366, the previously traced circuit for energizing the winding of the hold relay R370, thereby to cause the latter relay to operate. Upon restoring, the supervisory relay R510 completes, at the contacts 513, an obvious path, including the contacts 525, for applying ground potential to the conductor C603 extending to the link allotter 600; completes, at the contacts 513, an obvious path, including the contacts 525 and 584, for applying ground potential to the conductor C604 extending to the link allotter 600; and completes, at the contacts 513, an obvious circuit, including the contacts 525 and 584, for energizing the upper winding of the pulse control relay R550, thereby to cause the latter relay to operate. Upon operating, the pulse control relay R550 completes, at the contacts 557, the previously traced holding circuit for energizing the lower winding thereof; and completes, at the contacts 551, the previously traced original circuit for energizing the winding of the impulse relay R920 in the by-pass switch 900, thereby to cause the latter relay to operate. Upon operating, the impulse relay R920 completes, at the contacts 922, the previously traced circuit for energizing the winding of the hold relay R940, thereby to cause the latter relay to operate. Upon operating, the hold relay R940 completes, at the contacts 942, the previously traced multiple circuit for energizing the lower winding of the stop relay R730 and the winding of the cutoff relay R570; thereby to condition the stop relay R730 to operate when the upper winding thereof is energized and to cause the cutoff relay R570 to operate. Upon operating, the cutoff relay R570 completes, at the contacts 573, the previously traced original circuit for energizing the winding of the dial relay R930 in the by-pass switch 900, thereby to cause the latter relay to operate. Upon operating, the dial relay R930 interrupts, at the contacts 932, the previously traced circuit for energizing the winding of the hold relay R940, thereby to cause the latter relay to restore shortly thereafter. Also the cutoff relay R570 interrupts, at the contacts 575, the previously traced holding circuit for energizing the lower winding of the pulse control relay R550; however, the latter relay is retained in its operated position due to the completed circuit for energizing the upper winding thereof at this time. Further the cutoff relay R570 interrupts, at the contacts 574, the connection between the conductor C401 extending to the toll line circuits 400, etc., and to the C. L. R. trunk circuits 440, etc., and the conductor C816 in the control cable 501.

Further, upon operating, the pulse control relay R550 completes, at the contacts 552 and 555, the previously traced bridge between the impulse conductor C605 extending to the link allotter 600 and the line conductors C301 and C302 of the control trunk 300; whereby an alternative circuit is completed for energizing the upper winding of the pulse relay R365, the last-mentioned circuit extending from ground by way of the upper winding of R365, the contacts 364, the winding 324 of the repeater 320, the line conductor C302 of the control trunk 300, the winding 503 of the repeater 501, the contacts 555, the impulse conductor C605, the contacts 683 and the resistor 685 to battery.

The application of ground potential to the conductors C603 and C604 extending to the link allotter 600 completes the previously traced circuits for respectively energizing the upper winding of the control relay R660 and the winding of the pulse relay R680, thereby to cause the relays mentioned to operate. Upon operating, the pulse relay R680 cooperates with the pulse relay R670, in the manner previously explained; whereby operation of these relays through the cycles previously explained is initiated in order to effect sequential operation of the link relays R610, R620, etc., in the manner previously described. In the present example, when the link relay R610 operates it completes, at the contacts 613, an alternative circuit for energizing the upper winding of the link select relay R580; this circuit extending from the grounded conductor C603 extending to the link allotter 600 by way of the contacts 613, the conductor C602 and the upper winding of R580 to battery. When thus energized the link select relay R580 operates to complete, at the contacts 583, an obvious holding circuit, including the contacts 564 and 524, for energizing the lower winding thereof in series with the lower winding of the supervisory relay R520; and to interrupt, at the contacts 584, the previously traced alternative circuit for energizing the upper winding of the pulse control relay R550, thereby to cause the latter relay to restore. Upon restoring, the pulse control relay R550 interrupts, at the contacts 551 and 554, the original circuits for respectively energizing the windings of the impulse relay R920 and the dial relay R930 in the by-pass switch 900; and completes, at the contacts 556, the previously traced series circuit for energizing the upper winding of the pulse relay R365 and the winding of the dial relay R930, thereby to retain the pulse relay R365 and the dial relay R930 in their operated positions and to cause the impulse relay R920 to restore. Upon restoring, the impulse relay R920 completes, at the contacts 923, a circuit, including the contacts 933, 956, and 582, for energizing the winding of the control relay R560, thereby to cause the latter relay to operate. Upon operating, the control relay R560 completes, at the contacts 563, an obvious alternative holding circuit, including the contacts 583 and the resistor 598, for energizing the lower winding of the link select relay R580; interrupts, at the contacts 562, the previously traced circuit for energizing the upper winding of the supervisory relay R520; and interrupts, at the contacts 564, the previously traced series holding circuit for energizing the lower winding of the link select relay R580 and the lower winding of the supervisory relay R520, whereby the link select relay R580 is retained in its operated position and the supervisory relay R520 restores.

Also the control relay R560 completes, at the contacts 566, the previously traced holding circuit for energizing the lower winding of the first link relay R610 in the link allotter 600; and completes, at the contacts 565, the previously traced circuit, including the conductor C601 and the contacts 611 of the operated first link relay R610 in the link allotter 600, for energizing in series the lower windings of the start relays R860 and R870 in the first toll link 800, whereby the latter relays operate. Upon operating, the start relay R870 completes, at the contacts 874, the previously traced holding circuit for energizing the upper winding thereof; and prepares, at the contacts 873, the previously traced holding circuit for energizing the upper winding of the start relay R860; however, the latter holding circuit is not completed at this time due to the operated position of the control relay R560 in the link control equipment 500.

Also, upon operating, the link select relay R580 interrupts, at the contacts 584, the previously traced path for applying ground potential to the conductor C604 extending to the link allotter 600, thereby to arrest further operation of the pulse relays R670 and R680 therein, in the manner previously explained. During the operation of the pulse relays R670 and R680 in the link allotter 600 one impulse was transmitted at the contacts 683 of the pulse relay R680 over the previously traced path, including the line conductor C302 of the control trunk 300, to the pulse relay R365; thereby to effect operation of the first signal relay R380 in order to illuminate the first link indicator lamp L351 at the control operator position 22 in the central office 21, in the manner previously explained. The illumination of the first link indicator lamp L351 at the control operator position 22 indicates to the operator thereat that the connection routed by way of the first toll link 800 in the remote office 31 requires supervision, the call lamp L326 at the control operator position 22 being extinguished at this time.

Upon operating, the start relay R860 in the first toll link 800 interrupts, at the contacts 869, the previously traced original circuit for energizing the lower winding of the supervisory relay R850; and interrupts, at the contacts 861', a further point in the previously traced holding circuit for energizing the lower winding of the supervisory relay R850 in series with the upper winding of the supervisory relay R520; the last-mentioned holding circuit being interrupted at this time, at the contacts 562, incident to the operation of the control relay R560. Accordingly, the supervisory relay R850 restores to interrupt, at the contacts 853, the previously traced circuit for energizing the upper winding of the link select relay R580. However, the latter relay remains in its operated position due to the completed holding circuit for energizing the lower winding thereof at this time.

The operator at the control operator position 22 in the central office 21 then proceeds to answer the supervision on the first toll link 800 by operating the link listening key K333, whereby the cut-in relay R360 is operated in the manner previously explained. Upon operating, the cut-in relay R360 completes, at the contacts 363, the previously traced circuit for energizing the upper winding of the pulse relay R365 in series with the winding of the dial relay R930 in the by-pass switch 900; completes, at the contacts 365, the previously traced circuit for energizing the lower winding of the pulse relay R365 in series with the winding of the impulse relay R920 in the by-pass switch 900; and completes, at the contacts 368, the previously traced holding circuit for energizing the winding of the hold relay R370. Accordingly, the hold relay R370, the pulse relay R365 and the dial relay R930 are retained in their operated positions and the impulse relay R920 operates. Upon operating, the impulse relay R920 interrupts, at the contacts 923, the previously traced circuit for energizing the winding of the control relay R560, thereby to cause the latter relay to restore shortly thereafter. Upon restoring, the control relay R560 completes, at the contacts 561, the previously traced holding circuit for energizing the upper winding of the start relay R860 in the first toll link 800; and reprepares, at the contacts 562, the previously traced circuit, including the supervisory conductor C806 in the control cable 501, for energizing the winding of the supervisory relay R510. Further the control relay R560 interrupts, at the contacts 563, the previously traced holding circuit for energizing the lower winding of the link select relay R580, thereby to cause the latter relay to restore shortly thereafter. Further the control relay R560 interrupts, at the contacts 565, the previously traced circuit, including the conductor C601, for energizing the lower windings of the start relays R860 and R870 in the first toll link 800 in series; however, the latter relays remain in their operated positions due to the completed holding circuits for energizing the upper windings thereof at this time. Further the control relay R560 interrupts, at the contacts 566, the previously traced holding circuits for energizing the lower winding of the first link relay R610 in the link allotter 600, thereby to cause the latter relay to restore. At this time the control operator position 22 in the central office 21 is operatively connected by way of the control trunk 300 to the link control equipment 500; and the latter equipment is operatively connected to the first toll link 800, in the manner previously explained.

The operator at the control operator position 22 then challenges the release of the connection routed by way of the first toll link 800 and, upon determining that the connection has been released, operates the wipe-out key K329. When the wipe-out key K329 is thus operated there is interrupted, at the contacts 330 thereof, the previously traced circuit for energizing in series the upper winding of the pulse relay R365 and the winding of the dial relay R930 in the by-pass switch 900, thereby to cause the latter relay to restore. Also, at the contacts 331 of the wipe-out key K329, there is completed a path, including the ringing conductor C332, for projecting ringing current over the line conductor C302 of the control trunk 300; this path including the contacts 342 of the dial key K339, the contacts of the ring call key K343, the contacts 346 of the trunk release key K344, the contacts 363, and the winding 324 of the repeater 320. The ringing current projected over the line conductor C302 of the control trunk 300 completes a circuit, including the winding 503 of the repeater 501 and the contacts 556 and 573, for energizing the winding of the release relay R770. When thus energized the release relay R770 operates to complete, at the contacts 771, an obvious circuit for energizing the winding of the release slave relay R780, thereby to cause the latter relay to operate shortly thereafter, the release slave relay R780 being of the slow-to-operate type.

Upon operating, the release slave relay R780 completes, at the contacts 781 and 782, obvious paths for applying ground potential to the release conductors C810 and C807 in the control cable 501. The application of ground potential to the release conductor C807 completes an obvious path, including the contacts 862', for short-circuiting the winding of the answer hold relay R840; and the application of ground potential to the release conductor C810 completes the previously traced path for short-circuiting the upper winding of the call hold relay R880, whereby both the answer hold relay R840 and the call hold relay R880 restore. Also the application of ground potential to the release conductor C807 completes an obvious path for short-circuiting the winding of the answer pilot relay R710, thereby to cause this relay to restore and interrupt, at the contacts 712, the previously mentioned circuit for energizing the winding of the answer pilot slave relay R720, whereupon the latter relay restores.

The operator at the control operator position 22 then restores the wipe-out key K329, thereby to interrupt, at the contacts 331 thereof, the previously traced path for projecting ringing current over the line conductor C302 of the control trunk 300 in order to interrupt the previously traced circuit for energizing the winding of the release relay R770. The release relay R770 then restores in order to effect the restoration of the release slave relay R780, in an obvious manner. Also, at the contacts 330 of the wipe-out key K329, the previously traced circuit for energizing the upper winding of the pulse relay R365 in series with the winding of the dial relay R930 in the by-pass switch 900 is recompleted; thereby to cause the dial relay R930 to reoperate in order to effect the restoration of the hold relay R940, in the manner previously explained. The operator at the control operator position 22 then operates the release trunk key K344, thereby to interrupt, at the contacts 345 thereof, the previously traced circuit for energizing the lower winding of the pulse relay R365 in series with the winding of the impulse relay R920 in the by-pass switch 900; and to interrupt, at the contacts 346 thereof, the previously traced circuit for energizing the upper winding of the pulse relay R365 in series with the winding of the dial relay R930 in the by-pass switch 900, whereby the impulse relay R920 and the dial relay R930 restore. Upon restoring, the dial relay R930 interrupts, at the contacts 931, the previously traced multiple circuit for energizing the lower winding of the stop relay R730 and the winding of the cutoff relay R570, thereby to cause the cutoff relay R570 to restore shortly thereafter. Upon restoring, the cutoff relay R570 interrupts, at the contacts 571 and 572, the previously traced holding circuits for energizing the upper windings of the start relays R860 and R870 in the first toll link 800, thereby to cause the latter relays to restore. At this time, the first toll link 800, as well as the link control equipment 500, is completely released.

The operator at the control operator position 22 then restores the trunk listening key K333 and the release trunk key K344, thereby to cause the cut-in relay R360 to restore. At this time the apparatus at the control operator position 22 is completely released, the pulse relay R365 having restored incident to the operation of the release trunk key K344. When the pulse relay R365 restored it interrupted, at the contacts 366, the previously traced holding circuit for energizing the winding of the hold relay R370, whereby the latter relay restored shortly thereafter and effected the restoration of the first signal relay R380. When the first signal relay R380 restored it extinguished the first link indicating lamp L351.

When the answer hold relay R840 in the first toll link 800 was restored ground potential was removed, at the contacts 843 thereof, from the control conductor C463 of the trunk 460, thereby to interrupt the previously traced holding circuit for energizing the winding of the seizure relay R490 in the C. L. R. trunk circuit 440 in order to cause the latter relay to restore. Upon restoring, the seizure relay R490 interrupts, at the contacts 492, the previously mentioned path for applying ground potential to the control conductor C453 of the C. L. R. trunk 450, thereby to effect the release of the local connector 33 and the local finder 32 and to mark the C. L. R. trunk 450 as idle to the local connectors having access thereto. When the local finder 32 is thus released the line circuit 37 operates in order to mark the subscriber line 36, extended to the subscriber substation T1 in the remote office 31, as idle to the toll connectors and the local connectors having access thereto.

When the call hold relay R880 in the first toll link 800 was restored ground potential was removed, at the contacts 883 thereof, from the control conductor C415 of the trunk 415, thereby to interrupt the previously traced holding circuit for energizing the winding of the seizure relay R430 in the toll line circuit 400 in order to cause the latter relay to restore. Also when ground potential is removed from the control conductor C415 of the trunk 415 ground potential is removed from the control conductor C418 thereof, thereby to mark the trunk 415 as idle to the call switches of the toll links in the group having access thereto. At this time the established connection is completely released and both the C. L. R. trunk 450 and the toll line 410 are available for further use.

In connection with the operation of the link control equipment 500, it is pointed out that when all of the links in the associated group are busy the connection in each of the links between the conductor C816 and the start conductor C817 is interrupted, thereby positively to prevent operation of the answer start relay R530 at this time. Also when the apparatus at the control operator position 22 is operatively connected to the control trunk 300 the cut off relay R570 occupies its operated position, thereby to interrupt, at the contacts 574, the connection between the conductor C401 extending to the toll line circuits 400, etc., and to the C. L. R. trunk circuits 440, etc., and the conductor C816, thereby positively to prevent operation of the answer start relay R530 at this time. Also when the answer switch of one of the toll links in the associated group is hunting for a calling trunk the hold relay R540 occupies its operated position, thereby to interrupt, at the contacts 542, a point in the previously traced connection for energizing the winding of the answer start relay R530, thereby positively to prevent operation of the latter relay at this time. Finally when the links in the associated group are awaiting supervision the supervisory relay R520 occupies its operated position, thereby to interrupt, at the contacts 521, the previously traced circuit for energizing the winding of the answer start relay R530, thereby positively to prevent operation of the latter relay at this time.

Further, in connection with the operation of the link control equipment 500, it is pointed out that while the answer switch of one of the links in the associated group is hunting for a calling trunk the hold relay R540 occupies its operated position; thereby to interrupt, at the contacts 543, a point in the previously traced circuit, including the supervisory conductor C806, for energizing the winding of the supervisory relay R510, thereby positively to prevent operation of the latter relay at this time. Further it is noted that when the control relay R560 occupies its operated position it interrupts, at the contacts 562, a point in the circuit, including the supervisory conductor C806, for energizing the winding of the supervisory relay R510, thereby positively to prevent operation of the latter relay at this time; the control relay R560 occupies its operated position after the answer switch of one of the toll links in the associated group has operated to find a calling trunk and prior to the time that the operator at the control operator position 22 connects the associated equipment to the control trunk 300. Further it is pointed out that when the by-pass switch 900 occupies its operated position the control relay R590 and consequently the answer split relay R750 occupy their operated positions; the operated answer split relay R750 interrupts, at the contacts 755, a point in the previously traced circuit for energizing the lower winding of the supervisory relay R520; accordingly, at this time, even though the supervisory relay R510 operates, it is ineffective to cause operation of the supervisory relay R520.

Further, in connection with the operation of the link control equipment 500, it is pointed out that the operator at the control operator position 22 may, during the extension of a call over one of the links in the group, receive supervision in conjunction with another of the links in the group; then leave the one link temporarily and enter the other link; then release the other link and enter the one link; and then continue with the extension of the call by way of the one link; thereby effecting lapping of call handling. For example, assume that the operator at the control operator position 22 has answered a call on a link, not shown, in the associated group; has operated the trunk listening key K333, thereby to connect the equipment at the control operator position 22 to the control trunk 300; has not yet dialed the called number, in order to operate the by-pass switch 900; and that a connection routed by way of the first toll link 800 in the associated group is released. Under these conditions the supervisory relay R850 in the first toll link 800 operates in order to effect operation of the supervisory relay R510 in the link control equipment 500, the hold relay R540 and the control relay R560 occupying their restored positions at this time. The supervisory relay R510 effects operation of the supervisory relay R520 and the latter relay effects restoration of the supervisory relay R510, whereby the pulse control relay R550 operates and a cycle of operation of the pulse relays R670 and R680 and operation of the control relay R660 in the link allotter 600 are effected, in the manner previously explained. The operation of the pulse relays R670 and R680 in the link allotter 600 causes operation of the control relay R375 and the first signal relay R380 at the control operator position 22, in the manner previously explained; thereby to illuminate the first link indicator lamp L351 in order to indicate to the operator thereat that the first toll link 800 in the associated group requires supervision. Upon operating, the first link relay R610 in the link allotter 600 effects operation of the link select relay R580 in the link control equipment 500, in the manner previously explained. Upon operating, the link select relay R580 effects restoration of the pulse control relay R550, in the manner previously explained; and completes, at the contacts 583, the previously traced holding circuit for energizing the lower winding thereof in series with the lower winding of the supervisory relay R520.

The operator at the control operator position 22 then operates the trunk supervisory key K336, thereby to interrupt, at the contacts 338 thereof, the previously traced holding circuit for energizing the winding of the hold relay R370; whereupon the latter relay restores in order to effect the restoration of the control relay R375 and the first signal relay R380, in the manner previously explained. Also, at the contacts 337 of the trunk supervisory key K336, the previously traced circuit for energizing the lower winding of the pulse relay R365 and the winding of the impulse relay R920 in the by-pass switch 900 is interrupted, assuming that the dial key K339 occupies its restored position, thereby to cause the latter relay to restore. Upon restoring, the impulse relay R920 completes, at the contacts 923, the previously traced circuit for energizing the winding of the control relay R560, thereby to cause the latter relay to operate. Upon operating, the control relay R560 interrupts, at the contacts 562, the previously traced circuit for energizing the upper winding of the supervisory relay R520 in series with the lower winding of the supervisory relay R850 in the first toll link 800; and interrupts, at the contacts 564, the previously traced circuit for energizing the lower winding of the link select relay R580 in series with the lower winding of the supervisory relay R520, whereupon the supervisory relay R520 restores. Further the control relay R560 completes, at the contacts 565, the previously traced circuit for energizing in series the lower windings of the start relays R860 and R870 in the first toll link 800, thereby to cause the latter relays to operate. Upon operating, the start relay R870 completes, at the contacts 874, the previously traced holding circuit for energizing the upper winding thereof; however, the start relay R870 does not complete, at the contacts 873 thereof, the previously traced circuit for energizing the upper winding of the start relay R860, due to the operated position of the control relay R560 in the link control equipment 500. Further the control relay R560 completes, at the contacts 566, the previously traced holding circuits for energizing the lower winding of the first link relay R610 in the link allotter 600. Upon operating, the start relay R860 in the first toll link 800 interrupts, at the contacts 869, the previously traced original circuit for energizing the lower winding of the supervisory relay R850; and interrupts, at the contacts 851', a further point in the previously traced holding circuit for energizing the lower winding of the supervisory relay R850 in series with the upper winding of the supervisory relay R529, thereby to cause the supervisory relay R850 to restore. Upon restoring, the supervisory relay R850 interrupts, at the contacts 853, the previously traced circuit for energizing the upper winding of the link select relay R580; however, the latter relay is retained in its operated position at this time due to the completed holding circuit for energizing the lower winding thereof.

The operator at the control operator position 22 then operates and restores the wipe-out key K329, thereby to cause a splash of ringing current to be transmitted over the line conductor C302 of the control trunk 300; whereby the release relay R770 and the release slave relay R780 are operated, in the manner previously explained. Upon operating, the release slave relay R780 completes, at the contacts 781 and 782, the previously traced paths for applying ground potential to the release conductors C810 and C807, respectively, in the control cable 501; whereby the previously traced paths for short-circuiting the upper winding of the call hold relay R880 and the winding of the answer relay R840 are completed in order to cause the latter relays to restore and effect the release of the first toll link 800, in the manner previously explained.

At this point it is noted that in the toll link, not shown, in the associated group the start relay (corresponding to the start relay R860) does not occupy its operated position due to the absence of ground potential upon the conductor C811 in the control cable 501; the control relay R560 occupying its operated position at this time, as previously noted. Thus, the grounded release conductors C810 and C807 in the control cable 501 do not effect short-circuiting of the upper winding of the call hold relay and the winding of the answer hold relay in the link not shown. Hence, it will be understood that the toll link, not shown, is not released; whereas, the first toll link 800 is released.

After the wipe-out key K329 at the control operator position 22 is returned to its normal position the release relay R770 and the release slave relay R780 restore, whereby ground potential is removed from the release conductors C810 and C807 in the link control equipment 500. The operator at the control operator position 22 then restores the trunk supervisory key K336, thereby to recomplete, at the contacts 337 thereof, the previously traced circuit for energizing the lower winding of the pulse relay R365 in series with the winding of the impulse relay R920 in the by-pass switch 900 in order to cause the latter relay to reoperate. Upon reoperating, the impulse relay R920 interrupts, at the contacts 923, the previously traced circuit for energizing the winding of the control relay R560, thereby to cause the latter relay to restore shortly thereafter. Upon restoring, the control relay R560 interrupts, at the contacts 563, the previously traced holding circuit for energizing the lower winding of the link select relay R580, thereby to cause the latter relay to restore shortly thereafter. Further the control relay R560 interrupts, at the contacts 565, the previously traced circuit for energizing the lower windings of the start relays R860 and R870 in the first toll link 800, thereby to cause the later relays to restore. Finally the control relay 560 interrupts, at the contacts 566, the previously traced multiple holding circuits for energizing the lower winding of the first link relay R610 in the link allotter 600, thereby to cause the latter relay to restore.

At this time the equipment at the control operator position 22 in the central office 21 is again connected to the control trunk 300 and the toll link, not shown, in the associated group is connected to the control cable 501. Also it is pointed out that when the control relay R560 restores it completes, at the contacts 561, the previously mentioned path for applying ground potential to the conductor C811 in the control cable 501, whereby the holding circuit for energizing the upper winding of the start relay in the toll link, not shown, (corresponding to the start relay R860) is completed in order to cause the latter relay to operate. At this time the operator at the control operator position 22 may operate the dial key K339 and continue with the extension of the call on the toll link, not shown, in the associated group which is connected to the control cable 501 and consequently to the link control equipment 500, in the manner previously explained.

*Extension of a toll call from the distant office to the remote office*

First considering the extension of a toll call from the toll operator position 42 in the distant office 41 to the remote office 31, the operator at the toll operator position 42 selects an idle toll line, such, for example, as the toll line 410, and then operates the associated position equipment to cause ringing current to be projected momentarily thereover. The ringing current projected over the toll line 410 completes an obvious circuit, including the contacts 431 and 421, for energizing the upper winding of the line relay R420 in the toll line circuit 400, thereby to cause the latter relay to operate. Upon operating, the line relay R420 completes, at the contacts 422, an obvious holding circuit, including the contacts 434, for energizing the lower winding thereof in series with the winding of the control relay R425, thereby to cause the latter relay to operate. Also the line relay R420 interrupts, at the contacts 421, a point in the previously traced circuit for energizing the upper winding thereof. Upon operating, the control relay R425 completes, at the contacts 428, an obvious path for applying ground potential to the control conductor C415 of the trunk 415, thereby to mark this trunk as busy to the by-pass switch 900 having access thereto; and completes, at the contacts 426, an obvious path for applying battery potential in multiple by way of the resistor 436 and the winding of the seizure relay R430 to the control conductor C418 of the trunk 415, thereby to mark this trunk as a calling trunk to the answer switch of the selected toll link in the associated group. Further the control relay R425 completes, at the contacts 429, an obvious path, including the contacts 435, for applying ground potential to the conductor C401, thereby to complete the previously traced circuit for energizing the winding of the answer start relay R530 in the link control equipment 500, assuming that there is an idle toll link in the associated group and that the link control equipment 500 is in readiness for operation by way of the start conductor C817 in the control cable 501, as explained hereinbefore.

The link control equipment 500 operates in conjunction with the link allotter 600 in order to cause an idle toll link in the associated group to operate and to cause the link identifying impulses to be transmitted over the control trunk 300 to the control operator position 22 in the central office 21, in the manner previously explained. Assuming that the link allotter 600 selects the first toll link 800 in the associated group for use, operation of the answer switch 820 thereof is initiated; whereby the wipers noted of the answer switch 820 are driven step by step in the counterclockwise direction until the wiper 823 thereof engages the contact in the associated contact bank terminating the control conductor C418 of the calling trunk 415. At this time, further operation of the answer switch 820 is arrested due to operation of the stop relay R590 in the link control equipment 500 and the answer hold relay R840 in the first toll link 800, in the manner previously explained. Upon operating, the answer hold relay R840 completes, at the contacts 843, a circuit for energizing the winding of the seizure relay R430 in the toll line circuit 400, this circuit extending from ground by way of the contacts 843, the wiper 823 of the answer switch 820 and the engaged contact in the associated contact bank, the control conductor C418 of the trunk 415, the contacts 426 and the winding of R430 to battery. When thus energized the seizure relay R430 operates to complete, at the contacts 432, a holding circuit substantially identical to that traced above for energizing the winding thereof. Also the seizure relay R430 interrupts, at the contacts 431, a further point in the previously traced circuit for energizing the upper winding of the line relay R420; interrupts, at the contacts 433, the previously traced path for connecting battery potential by way of the resistor 436 to the control conductor C418 of the trunk 415; and interrupts, at the contacts 435, the previously traced path for applying ground potential to the conductor C401 extending to the link control equipment 500. Also the seizure relay R430 interrupts, at the contacts 434, the previously traced holding circuit for energizing the lower winding of the line relay R420 in series with the winding of the control relay R425, thereby to cause the latter relays to restore. Upon restoring, the control relay R425 completes, at the contacts 427, an obvious path, including the contacts 432, between the grounded control conductor C418 of the trunk 415 and the control conductor C415 thereof, thereby to retain the trunk 415 marked as busy to the by-pass switch 900.

The operator at the control operator position 22 in the central office 21 answers the call and then operates the associated position equipment in order to initiate operation of the by-pass switch 900, in the manner previously explained. In the present example, the by-pass switch 900 is operated to cause the wiper set of the Strowger mechanism 910 therein to seize a trunk extending to an idle trunk line circuit in the associated group, such, for example, as the trunk 1030 extending to the trunk line circuit 1000. When the wiper set of the Strowger mechanism 910 seizes the trunk 1030 ground potential is applied by way of the test wiper 913 thereof to the control conductor C1033 of the trunk 1030, thereby to complete an obvious circuit for energizing the winding of the dial relay R1070 in the trunk line circuit 1000. When thus energized the dial relay R1070 operates to interrupt, at the contacts 1071 and 1073, a connection traced hereinafter between the line conductors C1021 and C1022 of the trunk 1020 extending to the toll connector 35 and the lower winding of the answer relay R1060. Also the dial relay R1070 completes, at the contacts 1072 and 1074, a loop circuit between the line conductors C1021 and C1022 of the trunk 1020, this loop circuit extending from the line conductor C1021 of the trunk 1020 by way of the contacts 1072, the line conductor C1031 of the trunk 1030, the line wiper 911 of the wiper set of the Strowger mechanism 910, the contacts 991 and 921, the windings 504 and 505 of the repeater 501, the contacts 992, the line wiper 912 of the wiper set of the Strowger mechanism 910, the line conductor C1032 of the trunk 1030, and the contacts 1074 to the line conductor C1022 of the trunk 1020. Further the dial relay R1070 completes, at the contacts 1075, an obvious path for applying ground potential to the control conductor C1023 of the trunk 1020. When the above-traced loop circuit, including the line conductors of the trunk 1020, is completed the toll connector 35 is rendered operative in response to digits transmitted thereto.

The operator at the control operator position 22 then proceeds to dial two additional digits over the control trunk 300, in the manner previously explained, which digits are repeated by the impulse relay R920 at the contacts 921 over the previously traced loop circuit, including the line conductors C1021 and C1022 of the trunk 1020 to the toll connector 35; thereby to cause the toll connector 35 to operate and seize the subscriber line extending to the called subscriber substation, such, for example, as the subscriber line 36 extending to the called subscriber substation T1. Also the test relay R990 in the by-pass switch 900 completes, at the contacts 997, a path, including the control wiper 914 of the wiper set of the Strowger mechanism 910 and the contacts 727, for applying battery potential by way of the upper winding of the stop relay R730 to the control conductor C1034 of the trunk 1030, and consequently to the control conductor C1015 of the trunk 1010 extending to the trunk line circuit 1000, thereby to mark the trunk 1010 as a calling trunk to the call switch 830 of the first toll link 800. Also at this time the link control equipment 500 initiates operation of the call switch 830 in the first toll link 800, whereby the wipers noted of the call switch 830 are driven step by step in the clockwise direction until the wiper 834 thereof engages the contact in the associated contact bank terminating the control conductor C1015 of the trunk 1010, whereupon a circuit is completed for energizing the upper winding of the stop relay R730 in the link control equipment 500. The last-mentioned circuit extends from ground by way of the contacts 871 and 884, the wiper 834 of the call switch 830 and the engaged contact in the associated contact bank to the control conductor C1015 of the trunk 1010; and therefrom by way of the previously traced path, including the upper winding of the stop relay R730, to battery. When thus energized the stop relay R730 operates in order to arrest further operation of the magnet M836 of the call switch 830 and to effect operation of the call hold relay R880 in the first toll link 800, in the manner previously explained.

Upon operating, the call hold relay R880 completes, at the contacts 883, a circuit, including the wiper 833 of the call switch 830 and the engaged contact in the associated contact bank and the control conductor C1013 of the trunk 1010, for energizing the winding of the seizure relay R1040, thereby to cause the latter relay to operate. Upon operating, the seizure relay R1040 completes, at the contacts 1041 and 1042, a connection between the windings 504 and 505 of the repeater 501 in the link control equipment 500 and the windings 1031 and 1032 of the repeater 1030 in the trunk line circuit 1000. This connection extends from the line conductors C1011 and C1012 of the trunk 1010 by way of the contacts 1041 and 1042 and the windings 1031 and 1032 of the repeater 1030 to the terminals of the condenser 1035; the line conductors C1011 and C1012 of the trunk 1010 being connected by way of the line wipers 831 and 832 of the call switch 830 and the engaged contacts in the associated contact banks, the contacts 861, 862 and 861, 864 to the line conductors C801 and C803 in the control cable 501; and the line conductors C801 and C803 in the control cable 501 being connected by way of the contacts 761 and 763 to the windings 504 and 505 of the repeater 501. Also the seizure relay R1040 completes, at the contacts 1043, an obvious multiple path for applying ground potential to the control conductor C1023.

After the subscriber at the called subscriber substation T1 in the remote office 31 answers the call the operator at the control operator position 22 momentarily operates the release trunk key K344 and restores the trunk listening key K333 in the associated position equipment, thereby to effect the disconnection of the position equipment at the control operator position 22 from the control trunk 300 and the release of the by-pass switch 900, in the manner previously explained. When the by-pass switch 900 is thus released the wiper set of the Strowger mechanism 910 therein is returned to its normal position, thereby to interrupt the previously traced circuit for energizing the winding of the dial relay R1070 in the trunk line circuit 1000, whereupon the latter relay restores. Upon restoring, the dial relay R1070 completes, at the contacts 1071 and 1073, the previously mentioned connection between the line conductors C1021 and C1022 of the trunk 1020 and the lower winding of the answer relay R1060. This connection extends from the line conductor C1021 of the trunk 1020 by way of the contacts 1071, the winding 1033 of the repeater 1030, the lower winding of R1060, the resistor 1063, the winding 1034 of the repeater 1030, and the contacts 1073 to the line conductor C1022 of the trunk 1020. At this time the upper winding of the answer relay R1060 is energized by way of an obvious circuit, including the grounded control conductor C1023 of the trunk 1020, and the lower winding of the answer relay R1060 is energized by way of the above-traced circuit, including the line conductors C1021 and C1022 of the trunk 1020 from reverse battery potential in the toll connector 35, the subscriber at the called subscriber substation T1 having previously answered the call, as previously noted. Hence the answer relay R1060 operates, this relay being of the polarized type. Upon operating, the answer relay R1060 completes, at the contacts 1061, an obvious circuit for energizing the winding of the supervisory relay R1050, thereby to cause the latter relay to operate and complete, at the contacts 1051, an obvious holding circuit, including the grounded control conductor C1023 of the trunk 1020, for energizing the winding thereof. Also the answer relay R1060 interrupts, at the contacts 1062, a path traced hereinafter for applying battery potential by way of the resistor 1064 to the control conductor C1014 of the trunk 1010, for a purpose more fully explained hereinafter. At this time an operative connection is completed between the calling toll operator position 42 in the distant office 41 and the called subscriber substation T1 in the remote office 31, this connection including the toll line 410, the toll line circuit 400, the trunk 415, the first toll link 800, the trunk 1010, the trunk line circuit 1000, the trunk 1020, the toll connector 35 and the subscriber line 36.

The release of this established connection may be initiated by the operator at the calling toll operator position 42 in the distant office 41 by operating the associated position equipment in order to cause ringing current to be projected over the toll line 410, whereby a circuit is completed for energizing the upper winding of the supervisory relay R850 in the first toll link 800; this circuit including the line conductors C411 and C412 of the toll line 410, the line conductors C416 and C417 of the trunk 415, the line wipers 821 and 822 of the answer switch 820 and the engaged contacts in the associated contact banks, the contacts 841 and 842, the contacts 851 and the upper winding of R850. When thus energized the supervisory relay R850 operates to complete, at the contacts 852, the previously traced holding circuit for energizing the lower winding thereof, including the supervisory conductor C806 in the control cable 501, assuming that the link control equipment 500 is in condition to receive supervision, in the manner previously explained.

On the other hand, the release of the established connection may be initiated by the subscriber at the called subscriber substation T1 by replacing the receiver of the telephone instrument thereat upon its associated switchhook in order to cause the toll connector 35 to operate and reverse battery potential over the line conductors of the trunk 1020. When battery potential is thus reversed over the line conductors C1021 and C1022 of the trunk 1020 the lower winding of the answer relay R1060 in the trunk circuit 1000 is energized in the opposite direction, thereby to cause the latter relay to restore, the answer relay R1060 being of the polarized type, as previously noted. Upon restoring, the answer relay R1060 completes, at the contacts 1062, the previously mentioned path, including the resistor 1064 and the contacts 1052, for applying battery potential to the control conductor C1014 of the trunk 1010. This application of battery potential to the control conductor C1014 of the trunk 1010 completes a circuit for energizing the lower winding of the supervisory relay R850 in the first toll link 800; and extends from ground by way of the lower winding of R850, the contacts 869 and 885 and the wiper 835 of the call switch 830 and the engaged contact in the associated contact bank to the control conductor C1014 of the trunk 1010 having battery potential thereon. When thus energized the supervisory relay R850 operates to complete, at the contacts 852, the previously traced holding circuit, including the supervisory conductor C806 in the control cable 501, for energizing the lower winding thereof, assuming that the link control equipment 500 is in readiness to receive supervision.

The subsequent operation of the link control equipment 500 to transmit the supervisory identifying signal over the control trunk 300 to the control operator position 22 in the central office 21 and the subsequent operation of the position equipment at the control operator position 22, in order to effect the release of the first toll link 800, are the same as previously explained. When the first toll link 800 is thus released ground potential is removed from the control conductor C418 of the trunk 415, thereby to interrupt the previously traced holding circuit for energizing the winding of the seizure relay R430 in the toll line circuit 400, whereupon the latter relay restores. Also at this time battery potential is applied by way of the resistor 436 and the winding of the seizure relay R430 and the contacts 427 to the control conductor C415 of the trunk 415; thereby to mark this trunk as idle to the by-pass switch 900 and to render the toll line 410 idle and available for further use, assuming that the operator at the toll operator position 42 in the distant office 41 had disconnected therefrom at this time. Also when the first toll link 800 is released ground potential is removed from the control conductor C1013 of the trunk 1010, thereby to interrupt the previously traced circuit for energizing the winding of the seizure relay R1040 in the trunk line circuit 1000, whereupon the latter relay restores. Upon restoring, the seizure relay R1040 interrupts, at the contacts 1043, the previously mentioned path for applying ground potential to the control conductor C1023, thereby to interrupt the previously mentioned holding circuit for energizing the winding of the supervisory relay R1050, whereupon the latter relay restores. Also when ground potential is removed from the control conductor C1023 of the trunk 1020 the toll connector 35 is released, whereby the subscriber line 36 extending to the called subscriber substation T1 is marked as idle to the toll connectors and the local connectors having access thereto, assuming that the subscriber at the called subscriber substation T1 has replaced the receiver of the telephone instrument thereat upon its associated switchhook at this time. At this time the previously traced established connection between the calling toll operator position 42 in the distant office 41 and the called subscriber substation T1 in the remote office 31 is completely released and the equipment previously utilized therein is now available for further use.

*Extension of a delayed call from the central office*

In order to extend a delayed call from the control operator position 22 in the central office 21 to the toll operator position 42 in the distant office 41 and to a subscriber substation, such, for example, as the subscriber substation T1 in the remote office 31, the operator at the control operator position 22 first operates the trunk listening key K333, thereby to complete, at the contacts 335 thereof, the previously traced circuit for energizing the winding of the cut-in relay R360. When thus energized the cut-in relay R360 operates to complete, at the contacts 363 and 365, the previously traced circuits for energizing the upper winding of the pulse relay R365 in series with the winding of the dial relay R930 in the by-pass switch 900 and for energizing the lower winding of the pulse relay R365 in series with the winding of the impulse relay R920 in the by-pass switch 900, whereby the pulse relay R365, the dial relay R930 and the impulse relay R920 operate. Upon operating, the pulse relay R365 completes, at the contacts 366, the previously traced circuit for energizing the winding of the hold relay R370, thereby to cause the latter relay to operate. Further the cut-in relay R360 completes, at the contacts 361 and 362, the previously traced connection between the repeater 310 and the repeater 320 at the control operator position 22.

The operator at the control operator position 22 then operates the dial key K339, thereby to complete, at the contacts 341 thereof, the previously traced alternative circuit, including the dial 327, for energizing the winding of the impulse relay R920 in the by-pass switch 900. Also, at the contacts 340 of the dial key K339, the previously traced original circuit for energizing the lower winding of the pulse relay R365 in series with the impulse relay R920 in the by-pass switch 900 is interrupted. Finally, at the contacts 342 of the dial key K339, the previously traced circuit for energizing the upper winding of the pulse relay R365 in series with the winding of the dial relay R930 in the by-pass switch 900 is interrupted. Accordingly, at this time, the pulse relay R365 and the dial relay R930 restore, the restoration of the pulse relay R365 effecting the restoration of the hold relay R370 shortly thereafter. Upon restoring, the dial relay R930 completes, at the contacts 932, the previously traced circuit for energizing the winding of the hold relay R940, thereby to cause the latter relay to operate and complete, at the contacts 942, the previously traced multiple circuit for energizing the lower winding of the stop relay R730 and the winding of the cutoff relay R570, whereby the cutoff relay R570 operates and the stop relay R730 is rendered fast to operate when the upper winding thereof is energized. Upon operating, the cutoff relay R570 interrupts, at the contacts 574, the previously traced connection between the conductor C401 extending to the various toll line circuits and C. L. R. trunk circuits and the start conductor C817.

The operator at the control operator position 22 then dials one or more digits into the by-pass switch 900, thereby to cause the latter switch to operate; whereupon the wiper set of the Strowger mechanism 910 seizes a trunk extending to an idle toll line circuit, such, for example, as the trunk 415, extending to the toll line circuit 400, in the manner previously explained. At this time the test relay R990 in the by-pass switch 900 occupies its operated position, thereby to complete, at the contacts 996, the previously traced circuit for energizing the winding of the call start relay R740 in order to cause the latter relay to operate. Upon operating, the call start relay R740 completes, at the contacts 741, a circuit, including the contacts 731, 721 and 591, for energizing the lower winding of the stop relay R590; and prepares, at the contacts 742, a path traced hereinafter for short-circuiting the upper winding of the stop relay R590. The stop relay R590 does not operate at this time as this relay is of the polarized type, as previously noted. Also the call start relay R740 completes, at the contacts 743, an obvious alternative path, including the contacts 725, for applying ground potential to the conductor C816 in the control cable 501 due to the restored positions of the answer pilot relay R710 and the answer pilot slave relay R720; the relays last mentioned being restored in view of the fact that no toll link in the associated group is connected to the link control equipment 500 at this time. The application of ground potential to the conductor C816 completes the previously traced circuit for energizing the winding of the answer start relay R530, assuming that there is an idle toll link in the associated group at this time, thereby to cause the latter relay to operate. Upon operating, the answer start relay R530 effects operation of the hold relay R540 and the pulse control relay R550, and the subsequent restoration of the answer start relay R530, in the manner previously explained. Upon restoring, the answer start relay R530 completes, at the contacts 535, the previously traced path for applying ground potential to the conductors C603 and C604 extending to the link allotter 600, thereby to initiate operation of the link allotter 600, in the manner previously explained.

After the operator at the control operator position 22 operates the dial 327, in the manner previously explained, she restores the dial key K339, thereby to complete, at the contacts 342 thereof, the previously traced circuit, including the impulse conductor C605 extending to the link allotter 600, for energizing the upper winding of the pulse relay R365; whereupon the latter relay operates and effects the operation of the hold relay R370, in the manner previously explained. The link allotter 600 then operates, in the manner previously described, in order to select an idle toll link in the associated group, such, for example, as the first toll link 800. In the above-mentioned example, when the first link relay R610 in the link allotter 600 operates, the previously traced circuit, including the conductor C692, the grounded conductor C813 in the control cable 501 and the conductor C602, is completed for energizing the upper winding of the link select relay R580, thereby to cause the latter relay to operate. Upon operating, the link select relay R580 completes, at the contacts 585, the previously traced circuit, including the conductor C601, for energizing in series the lower windings of the start relays R860 and R870 in the first toll link 800, thereby to cause the latter relays to operate. Further the link select relay R580 effects the restoration of the pulse control relay R550, whereby the control trunk 300 is again operatively connected to the by-pass switch 900 in order to effect operation of the impulse relay R920 and the dial relay R930, in the manner previously explained. During the operation of the link allotter 600, the pulse relay R365 was operated, restored and then reoperated, thereby to effect operation of the first signal relay R380 and the consequent illumination of the first link indicator lamp L351, in the manner previously described. The illumination of the first indicator lamp L351 indicates to the operator at the control operator position 22 that the first toll link 800 in the associated group is being utilized in order to set up the present delayed call.

Upon operating, the start relay R860 in the first toll link 800 completes, at the contacts 863', the previously traced circuit for energizing the magnet M826 of the answer switch 820, thereby to cause the latter magnet to operate intermittently in order to drive the wipers noted of the answer switch 820 step by step in the counter-clockwise direction until the wiper 824 thereof engages the contact in the associated contact bank terminating the control conductor C419 of the trunk 415 extending to the toll line circuit 400; whereby a circuit for energizing the upper winding of the stop relay R730 is completed. The above-mentioned circuit extends from ground by way of the contacts 868, the wiper 824 of the answer switch 820 and the engaged contact in the associated contact bank, the control conductor C419 of the trunk 415, the control wiper 915 of the wiper set of the Strowger mechanism 910 in the by-pass switch 900, the contacts 993 and 728, and the upper winding of R730 to battery. When thus energized the stop relay R730 operates, thereby to interrupt, at the contacts 731, the previously traced circuit for energizing the winding of the magnet M826 of the answer switch 820; and to complete, at the contacts 733, an obvious alternative circuit, including the contacts 726, for energizing the winding of the answer pilot relay R710 in multiple with the winding of the answer hold relay R840 in the first toll link 800, whereby the latter relays operate. Upon operating, the answer hold relay R840 completes, at the contacts 845, the previously traced holding circuit for energizing the winding thereof in multiple with the winding of the answer pilot relay R710; and completes, at the contacts 843, the previously mentioned path for applying ground potential to the control conductor C418 of the trunk 415 in order to complete the previously traced holding circuit for energizing the winding of the seizure relay R430 in the toll line circuit 400, the latter relay being previously operated by way of the previously traced circuit, including the grounded control conductor C415 of the trunk 415 incident to the seizure of the trunk 415 by the by-pass switch 900. Upon operating, the answer pilot relay R710 interrupts, at the contacts 711, the previously traced holding circuit for energizing the winding of the hold relay R540, thereby to cause the latter relay to restore. Also the answer pilot relay R710 completes, at the contacts 712, the previously mentioned circuit for energizing the winding of the answer pilot slave relay R720, thereby to cause the latter relay to operate. Upon operating, the answer pilot slave relay R720 interrupts, at the contacts 728, the previously traced circuit for energizing the upper winding of the stop relay R730, thereby to cause the latter relay to restore. Also the answer pilot slave relay R720 prepares, at the contacts 727, the previously traced circuit, including the control wiper 914, for energizing the upper winding of the stop relay R730; however, the last-mentioned circuit cannot be completed at this time due to the operation of the wiper set of the Strowger mechanism 910 to the vertical level in the associated contact bank terminating the trunks extending to the toll line circuits which are utilized in order to make delayed calls. Also the answer pilot slave relay R720 interrupts, at the contacts 724, an obvious previously completed path for short-circuiting the upper winding of the stop relay R590, whereby operation of the latter relay was positively prevented while the hold relay R540 occupied its operated position.

As previously explained, during the operation of the link allotter 600 to find the idle first toll link 800 in the associated group, the pulse control relay R540 operated, thereby to complete, at the contacts 551 and 554, the previously traced alternative circuits for respectively energizing the windings of the impulse relay R920 and the dial relay R930 in the by-pass switch 900; whereby the latter relays operate in order to effect the restoration of the hold relay R940 shortly thereafter. It is noted that the hold relay R940 did not restore immediately, this relay being of the slow-to-release type; but subsequent to the operation of the answer switch 820 to find the trunk 415 extending to the calling toll line circuit 410, in the manner explained above. Upon restoring, the hold relay R940 effected operation of the release magnet M918 and the consequent release of the Strowger mechanism 910 in the by-pass switch 900, in the manner previously explained, whereby the control relays R950 and R975 and the test relay R990 were restored. Also, upon restoring, the test relay R990 interrupted, at the contacts 996, the previously traced circuit for energizing the winding of the call start relay R740, whereby the latter relay restored in the manner previously explained. At this time the equipment at the control operator position 22 is connected by way of the control trunk 300 to the windings 502 and 503 of the repeater 501; and the windings 504 and 505 of the repeater 501 are connected by way of the previously traced path, including the line conductors C804 and C802 in the control cable 501 and the first toll link 800, to the line conductors C416 and C417 of the trunk 415, and consequently to the line conductors C411 and C412 of the toll line 410 extending to the toll operator position 42 in the distant office 41. Also at this time the link allotter 600 is completely released, in the manner previously explained.

The operator at the control operator position 22 then momentarily operates the ring answer key K328, thereby to effect the restoration and the subsequent operation of the impulse relay R920 in the by-pass switch 900, in the manner previously explained. Upon restoring, the impulse relay R920 completes, at the contacts 923, the previously traced circuit for energizing the winding of the ring answer relay R745, thereby to cause the latter relay to operate and effect the operation of the split answer relay R750, in the manner previously explained. Upon operating, the split answer relay R750 interrupts, at the contacts 751 and 753, the previously traced connection between the windings 504 and 505 of the repeater 501 and the toll line 410; and completes, at the contacts 752 and 754, the previously traced circuit for projecting ringing current over the line conductors C411 and C412 of the toll line 410 to the toll operator position 42 in the distant office 41, thereby to indicate to the operator thereat that a toll call is waiting to be answered on the toll line 410. When the impulse relay R920 subsequently operates it effects the restoration of the ring answer relay R740 and the subsequent restoration of the split answer relay R750, in the manner previously explained, whereby the toll line 410 is again operatively connected to the windings 504 and 505 of the repeater 501.

When the operator at the toll operator position 42 in the distant office 41 answers the toll call on the toll line 410 she is advised by the operator at the control operator position 22 in the central office 21 that a delayed call is being set up. The operator at the control operator position 22 then reoperates the dial key K339 and dials one or more digits over the control trunk 300 into the by-pass switch 900 in order to cause the wiper set of the Strowger mechanism 910 to seize a trunk extending to an idle trunk line circuit in the associated group, such, for example, as the trunk 1030 extending to the trunk line circuit 1000, all in the manner previously explained. When the wiper set of the Strowger mechanism 910 seizes the trunk 1030 extending to the trunk line circuit 1000 the call switch 830 in the first toll link 800 operates, in the manner previously explained, in order to seize the trunk 1010 extending to the trunk line circuit 1000. The operator at the control operator position 22 then dials one or more digits over the control trunk 300 into the link control equipment 500; which digits are repeated therefrom by way of the by-pass switch 900, the trunk 1030, the trunk line circuit 1000 and the trunk 1020 to the toll connector 35, in the manner previously explained. The toll connector 35 then operates to seize the subscriber line 36 extending to the called subscriber substation T1. The operator at the control operator position 22 then manipulates the associated key equipment, thereby to cause ringing current to be projected over the subscriber line 36 to the called subscriber substation T1; and subsequently effects the disconnection of the associated position equipment from the control trunk 300, all in the manner previously explained. At this time the delayed connection is completed between the called toll operator position 42 in the distant office 41 and the called subscriber substation T1 in the remote office 31. The subsequent supervision and release of this delayed connection by the operator at the control operator position 22 is performed in the manner previously explained.

*Conclusions*

From the foregoing it is apparent that a telephone system is provided which comprises a central office, including a control operator position, and a remote office or switching center, including a plurality of switching links; whereby calls may be set up and supervised by way of the switching links in the remote office, over a single two-wire trunk extending between the central office and the remote office, under the control of the operator at the control operator position.

While one embodiment of the invention has been disclosed, it will be understood that various modifications may be made therein which are within the true spirit and scope of the invention.

What is claimed is:

1. In a telephone system, a first office terminating a plurality of lines and including a group of links, a remote second office including an operator position, a control trunk extending between said offices, automatic means for connecting an idle one of said links to said control trunk and for transmitting a signal over said control trunk indicative of said one link and for connecting said one link to a calling one of said lines, means responsive to the signal transmitted over said control trunk for indicating to the operator at said operator position the particular link in said group which is connected thereto, and means controllable over said control trunk from said operator position for connecting said one link to a called one of said lines.

2. In a telephone system, a plurality of lines, a group of links, a control trunk including a pair of talking conductors, an operator position, automatic means for connecting an idle one of said links to said control trunk and for transmitting a signal over a circuit including at least one of the talking conductors of said control trunk indicative of said one link and for connecting said one link to a calling one of said lines, means responsive to the signal transmitted over said circuit for indicating to the operator at said operator position the particular link in said group which is connected to said control trunk, and means controllable over said control trunk from said operator position for connecting said one link to a called one of said lines.

3. In a telephone system, a plurality of lines, a group of links, a control trunk of the two-conductor type, an operator position, automatic means for connecting an idle one of said links to said control trunk and for transmitting a signal over said control trunk indicative of said one link and for connecting said one link to a calling one of said lines, means responsive to the signal transmitted over said control trunk for indicating to the operator at said operator position the particular link in said group which is connected thereto, and means controllable over said control trunk from said operator position for connecting said one link to a called one of said lines.

4. In a telephone system, a plurality of lines, a group of links, a control trunk, an operator position, automatic means for connecting an idle one of said links to said control trunk and for transmitting a series of impulses over said control trunk indicative of said one link and for connecting said one link to a calling one of said lines, impulse counting means responsive to the series of impulses transmitted over said control trunk for indicating to the operator at said operator position the particular link in said group which is connected thereto, and means controllable over said control trunk from said operator position for connecting said one link to a called one of said lines.

5. In a telephone system, a plurality of lines, a group of links, a control trunk, an operator position, allotter means responsive to the presence of a calling one of said lines for successively testing the links in said group to find an idle link therein and for transmitting a signal over said control trunk each time a link in said group is tested, means for connecting any one of the links in said group tested as idle by said allotter means to said control trunk and for arresting the testing of the links in said group by said allotter means, whereby a number of signals indicative of said one link is transmitted over said control trunk, means responsive to the connection of said one link to said control trunk for connecting said one link to the calling one of said lines, signal counting means responsive to the signals transmitted over said control trunk for indicating to the operator at said operator position the particular link in said group which is connected thereto, and means controllable over said control trunk from said operator position for connecting said one link to a called one of said lines.

6. In a telephone system, first office terminating a plurality of lines and including a group of links, a remote second office including an operator position, a control trunk extending between said offices, automatic means for connecting an idle one of said links to said control trunk and for transmitting a signal over said control trunk indicative of said one link and for connecting said one link to a calling one of said lines, an indicator associated with said operator position and operative in response to the signal transmitted over said control trunk to indicate the particular link in said group which is connected to said control trunk, means controllable from said operator position for connecting said control trunk to said operator position and for releasing said indicator, and means controllable over said control trunk from said operator position for connecting said one link to a called one of said lines.

7. In a telephone system, first office terminating a plurality of lines and including a group of links, a remote second office including an operator position, a control trunk extending between said offices, automatic means controlled jointly by the presence of a calling one of said lines and an idle link in said group and an idle condition of said control trunk for connecting an idle one of said links to said control trunk and for transmitting a signal over said control trunk indicative of said one link and for connecting said one link to a calling one of said lines, means responsive to the signal transmitted over said control trunk for indicating to the operator at said operator position the particular link in said group which is connected thereto, and means controllable over said control trunk from said operator position for connecting said one link to a called one of said lines.

8. In a telephone system, first office terminating a plurality of lines and including a group of links and an automatic switch, a remote second office including an operator position, a control trunk extending between said offices, automatic means for connecting an idle one of said links to said control trunk and for transmitting a signal over said control trunk indicative of said one link and for connecting said one link to a calling one of said lines, means responsive to the signal transmitted over said control trunk for indicating to the operator at said operator position the particular link in said group which is connected thereto, means controllable over said control trunk from said operator position for operating said automatic switch to seize a called one of said lines, and means for connecting said one link to the called one of said lines seized by said automatic switch.

9. In a telephone system, a plurality of lines, a group of links, each of said links including an answer switch and a call switch, an automatic switch, a control trunk, an operator position associated with said control trunk, automatic means for connecting an idle one of said links to said control trunk and for transmitting a signal over said control trunk indicative of said one link and for operating the answer switch of said one link to seize a calling one of said lines, means responsive to the signal transmitted over said control trunk for indicating to the operator at said operator position the particular link in said group which is connected thereto, means controllable over said control trunk from said operator position for operating said automatic switch to seize a called one of said lines, and means for operating the call switch of said one link to seize the called one of said lines seized by said automatic switch.

10. In a telephone system, a first office terminating a plurality of lines and including a group of links, a remote second office including an operator position, a control trunk extending between said offices, means for setting up a connection between two of said lines by way of one of said links, automatic means responsive to the performance of a control operation over said connection for connecting said one link to said control trunk and for transmitting a signal over said control trunk indicative of said one link, means responsive to the signal transmitted over said control trunk for indicating to the operator at said operator position the particular link in said group which is connected thereto, and means for connecting said operator position to said control trunk.

11. In a telephone system, a plurality of lines, a group of links, a control trunk including a pair of talking conductors, an operator position, means for setting up a connection between two of said lines by way of one of said links, automatic means responsive to the performance of a control operation over said connection for connecting said one link to said control trunk and for transmitting a signal over a circuit including at least one of the talking conductors of said control trunk indicative of said one link, means responsive to the signal transmitted over said circuit for indicating to the operator at said operator position the particular link in said group which is connected to said control trunk, and means for connecting said operator position to said control trunk.

12. In a telephone system, a plurality of lines, a group of links, a control trunk of the two-conductor type, an operator position, means for setting up a connection between two of said lines by way of one of said links, automatic means responsive to the performance of a control operation over said connection for connecting said one link to said control trunk and for transmitting a signal over said control trunk indicative of said one link, means responsive to the signal transmitted over said control trunk for indicating to the operator at said operator position the particular link in said group which is connected thereto, and means for connecting said operator position to said control trunk.

13. In a telephone system, a plurality of lines, a group of links, a control trunk, an operator position, means for setting up a connection between two of said lines by way of one of said links, automatic means responsive to the performance of a control operation over said connection for connecting said one link to said control trunk and for transmitting a series of impulses over said control trunk indicative of said one link, impulse counting means responsive to the series of impulses transmitted over said control trunk for indicating to the operator at said operator position the particular link in said group which is connected thereto, and means for connecting said operator position to said control trunk.

14. In a telephone system, a plurality of lines, a group of links, a control trunk, an operator position, means for setting up a connection between two of said lines by way of one of said links, allotter means responsive to the performance of a control operation over said connection for successively testing the links in said group to find said one link and for transmitting a signal over said control trunk each time a link in said group is tested, means for connecting said one link to said control trunk when it is found by said allotter means and for arresting the testing of the links in said group by said allotter means, whereby a number of signals indicative of said one link is transmitted over said control trunk, signal counting means responsive to the signals transmitted over said control trunk for indicating to the operator at said operator position the particular link in said group which is connected thereto, and means for connecting said operator position to said control trunk.

15. In a telephone system, a plurality of lines, a group of links, a control trunk, an operator position, means for setting up a connection between two of said lines by way of one of said links, automatic means responsive to the performance of a control operation over said connection for connecting said one link to said control trunk and for transmitting a signal over said control trunk indicative of said one link, an indicator associated with said operator position and operative in responsive to the signal transmitted over said control trunk to indicate the particular link in said group which is connected to said control trunk, and means controllable from said operator position for connecting said control trunk to said operator position and for releasing said indicator.

16. In a telephone system, a plurality of lines, a group of links, an operator position, a control trunk extending to said operator position, automatic means responsive to the presence of a calling one of said lines for connecting an idle one of said links to said control trunk and for transmitting a signal over said control trunk indicative of said one link and for connecting said one link to the calling one of said lines, means controllable over said control trunk from said operator position for connecting said one link to a called one of said lines, thereby to complete a connection between said calling line and said called line including said operator position, additional means controllable over said control trunk from said operator position for disconnecting said one link from said control trunk, thereby to complete a connection between said calling line and said called line excluding said operator position, additional automatic means responsive to the performance of a control operation over the established connection including said one link for reconnecting said one link to said control trunk and for transmitting a signal over said control trunk indicative of said one link, and means responsive to the transmission of a signal over said control trunk for indicating to the operator at said operator position the particular link in said group which is connected thereto.

17. In a telephone system, a plurality of lines, a group of links, an operator position, a control trunk extending to said operator position, automatic means responsive to the presence of a calling one of said lines for connecting an idle one of said links to said control trunk and for transmitting a calling signal over said control trunk indicative of said one link and for connecting said one link to the calling one of said lines, means controllable over said control trunk from said operator position for connecting said one link to a called one of said lines, thereby to complete a connection between said calling line and said called line including said operator position, additional means controllable over said control trunk from said operator position for disconnecting said one link from said control trunk, thereby to complete a connection between said calling line and said called line excluding said operator position, additional automatic means responsive to the performance of a control operation over the established connection including said one link for reconnecting said one link to said control trunk and for transmitting a supervisory signal over said control trunk indicative of said one link, and an indicator associated with said operator position and operative to indicate the calling signals and the supervisory signals transmitted over said control trunk.

18. In a telephone system, a first office terminating a plurality of lines and including a group of links, each of said links including first and second switches, a second office including an operator position, a control trunk extending between said offices, means controllable over said control trunk from said operator position for connecting an idle one of said links to said control trunk and for operating the two switches of said one link to seize two called ones of said lines, means governed by said last-mentioned means for transmitting a signal over said control trunk indicative of said one link, and means responsive to the signal transmitted over said control trunk for indicating to the operator at said operator position the particular link in said group which is connected thereto.

19. In a telephone system, a plurality of lines, a group of links, each of said links including first and second switches, a control trunk including a pair of talking conductors, an operator position, means controllable over said control trunk from said operator position for connecting an idle one of said links to said control trunk and for operating the two switches of said one link to seize two called ones of said lines, means governed by said last-mentioned means for transmitting a signal over a circuit including at least one of the talking conductors of said control trunk indicative of said one link, and means responsive to the signal transmitted over said circuit for indicating to the operator at said operator position the particular link in said group which is connected to said control trunk.

20. In a telephone system, a plurality of lines, a group of links, each of said links including first and second switches, a control trunk of the two-conductor type, an operator position, means controllable over said control trunk from said operator position for connecting an idle one of said links to said control trunk and for operating the two switches of said one link to seize two called ones of said lines, means governed by said last-mentioned means for transmitting a signal over said control trunk indicative of said one link, and means responsive to the signal transmitted over said control trunk for indicating to the operator at said operator position the particular link in said group which is connected thereto.

21. In a telephone system, a plurality of lines, a group of links, each of said links including first and second switches, a control trunk of the two-conductor type, an operator position, means controllable over said control trunk from said operator position for connecting an idle one of said links to said control trunk and for operating the two switches of said one link to seize two called ones of said lines, thereby to complete a connection between said two called lines including said operator position, and additional means controllable over said control trunk from said operator position for disconnecting said one link from said control trunk, thereby to complete a connection between said two called lines excluding said operator position.

22. In a telephone system, a plurality of lines, a group of links, each of said links including first and second switches, an automatic switch, a control trunk of the two-conductor type, an operator position, means controllable over said control trunk from said operator position for operating said automatic switch to seize a first called one of said lines and for connecting an idle one of said links to said control trunk and for operating the first switch of said one link to seize said first called line and for releasing said automatic switch, and additional means controllable over said control trunk from said operator position for reoperating said automatic switch to seize a second called one of said lines and for operating the second switch of said one link to seize said second called line.

23. In a telephone system, a plurality of lines, a group of links, each of said links including first and second switches, an automatic switch, a control trunk of the two-conductor type, an operator position, means controllable over said control trunk from said operator position for selectively operating said automatic switch to seize a called one of said lines, means responsive to operation of said automatic switch to seize a first called line for connecting an idle one of said links to said control trunk and for operating the first switch of said one link to seize said first called line and for releasing said automatic switch, and means responsive to reoperation of said automatic switch to seize a second called line for operating the second switch of said one link to seize said second called line.

24. In a telephone system, a plurality of lines, a group of links, each of said links including an answer switch and a call switch, an automatic switch, a control trunk of the two-conductor type, an operator position, means for connecting an idle one of said links to said control trunk and for operating the answer switch thereof to seize a calling one of said lines, means controllable over said control trunk from said operator position for selectively operating said automatic switch to seize a called one of said lines, means controlled when one of said links is connected to said control trunk and in response to operation of said automatic switch to seize a called one of said lines for operating the call switch of said one link to seize said called lines, and means controlled when none of said links is connected to said control trunk and in response to operation of said automatic switch to seize a called one of said lines for connecting an idle one of said links to said control trunk and for operating the answer switch of said one link to seize said called line.

25. In a telephone system, a plurality of lines, a group of links, each of said links including first and second switches, a control trunk of the two-conductor type, an operator position associated with said control trunk, means for connecting both of the switches of any one of said links to said control trunk and for operating the two switches thereof to seize two of said lines, and means selectively controllable over said control trunk from said operator position to disconnect either one of the two switches of said one link from said control trunk and to project ringing current thereover and the line seized thereby.

26. In a telephone system, a plurality of lines, a group of links, each of said links including first and second switches, a control trunk of the two-conductor type, an operator position associated with said control trunk, means for connecting both of the switches of any one of said links to said control trunk and for operating the two switches thereof to seize two of said lines, and means selectively controllable over said control trunk from said operator position to disconnect either one of the two switches of said one link from said control trunk and to project ringing current thereover and the line seized thereby or to disconnect the two switches of said one link from said control trunk or to release the two switches of said one link.

27. In a telephone system, a plurality of lines, a group of links, a control trunk, an operator position, automatic means for connecting an idle first link to said control trunk and to a calling line, means controllable over said control trunk for connecting said first link to a called line and for disconnecting said first link from said control trunk, whereby said first link is rendered busy, automatic means for reconnecting a busy second link to said control trunk, additional means controllable over said control trunk for disconnecting said second link from the associated calling and called lines and from said control trunk, and interlock means for preventing more than one idle link and one busy link from being connected to said control trunk concurrently.

28. In a telephone system, a plurality of lines, a group of links, a control trunk, an operator position, means controllable over said control trunk for connecting an idle first link to said control trunk and for successively connecting said first link to two called lines and then for disconnecting said first link from said control trunk, whereby said first link is rendered busy, automatic means for reconnecting a busy second link to said control trunk, additional means controllable over said control trunk for disconnecting said second link from the associated two called lines and from said control trunk, and interlock means for preventing more than one idle link and one busy link from being connected to said control trunk concurrently.

29. In a telephone system, a plurality of lines, a group of links, a control trunk, an operator position, first means for connecting an idle one of said links to said control trunk, means controllable over said control trunk from said operator position for operating an idle one of said links connected thereto to set up a connection between two of said lines and then for disconnecting said last-mentioned link from said control trunk, second means for reconnecting a busy one of said links to said control trunk, additional means controllable over said control trunk from said operator position for releasing either a busy or an idle one of said links connected thereto and then for disconnecting said last-mentioned link from said control trunk, and means governed by said additional means when both an idle link and a busy link are connected to said control trunk for temporarily disconnecting the idle link from said control trunk and then reconnecting it thereto, thereby to prevent the release of the idle link.

THOMAS F. CROCKER.